United States Patent
Ito et al.

(10) Patent No.: US 8,471,519 B2
(45) Date of Patent: Jun. 25, 2013

(54) CONTROL DEVICE AND CONTROL METHOD FOR AC MOTOR

(75) Inventors: Takeshi Ito, Nagoya (JP); Takashi Ogawa, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 307 days.

(21) Appl. No.: 13/121,592

(22) PCT Filed: Sep. 29, 2009

(86) PCT No.: PCT/JP2009/066922
§ 371 (c)(1),
(2), (4) Date: Mar. 29, 2011

(87) PCT Pub. No.: WO2010/038727
PCT Pub. Date: Apr. 8, 2010

(65) Prior Publication Data
US 2011/0181231 A1    Jul. 28, 2011

(30) Foreign Application Priority Data

Sep. 30, 2008    (JP) ................................. 2008-254086

(51) Int. Cl.
*H02P 27/04*    (2006.01)
*H02P 27/08*    (2006.01)

(52) U.S. Cl.
CPC ...................................... *H02P 27/08* (2013.01)
USPC ........... 318/801; 318/727; 318/767; 318/798; 318/799; 318/800

(58) Field of Classification Search
CPC ...................................................... H02P 27/08
USPC .......................... 318/801, 800–798, 727, 767
See application file for complete search history.

(56) References Cited

U.S. PATENT DOCUMENTS 7,084,601 B2 *    8/2006    Maeda et al. ................. 318/806

FOREIGN PATENT DOCUMENTS

| JP | 9-215398 A | 8/1997 |
|---|---|---|
| JP | 2001-186799 A | 7/2001 |
| JP | 2001-352800 A | 12/2001 |
| JP | 2003-309997 A | 10/2003 |
| JP | 2004-072856 A | 3/2004 |
| JP | 2006-320039 A | 11/2006 |
| JP | 2008-011682 A | 1/2008 |

\* cited by examiner

*Primary Examiner* — Bentsu Ro
*Assistant Examiner* — David Luo
(74) *Attorney, Agent, or Firm* — Kenyon & Kenyon LLP

(57) ABSTRACT

A voltage command generation unit generates a voltage command value, based on a current deviation relative to a current command value. A dq-axis voltage filter generates a voltage command value subjected to a filtering process for smoothing a change of the voltage command value in a time axis direction. Then, the voltage command value subjected to the filter processing is subjected to a voltage amplitude correcting process and a dq inverse transformation coordinate converting process, so that a phase voltage command for an AC motor is generated. Thus, it is possible to prevent both an amplitude and a phase of the voltage command for the AC motor from being changed rapidly even at a time of control mode switchover.

7 Claims, 17 Drawing Sheets

FIG.2

| CONTROL SCHEME | SINUSOIDAL PWM | OVERMODULATION PWM | RECTANGULAR WAVE (ONE PULSE) |
|---|---|---|---|
| | PWM CONTROL MODE | | RECTANGULAR WAVE VOLTAGE CONTROL MODE |
| INVERTER OUTPUT VOLTAGE WAVEFORM | FUNDAMENTAL COMPONENT | FUNDAMENTAL COMPONENT | FUNDAMENTAL COMPONENT |
| MODULATION RATIO | 0~ABOUT 0.61 | MAX VALUE IN SINUSOIDAL PWM~0.78 | 0.78 |
| FEATURE | SMALL TORQUE VARIATION | IMPROVED OUTPUT IN MEDIUM SPEED AREA | IMPROVED OUTPUT IN HIGH SPEED AREA |

FIG.3

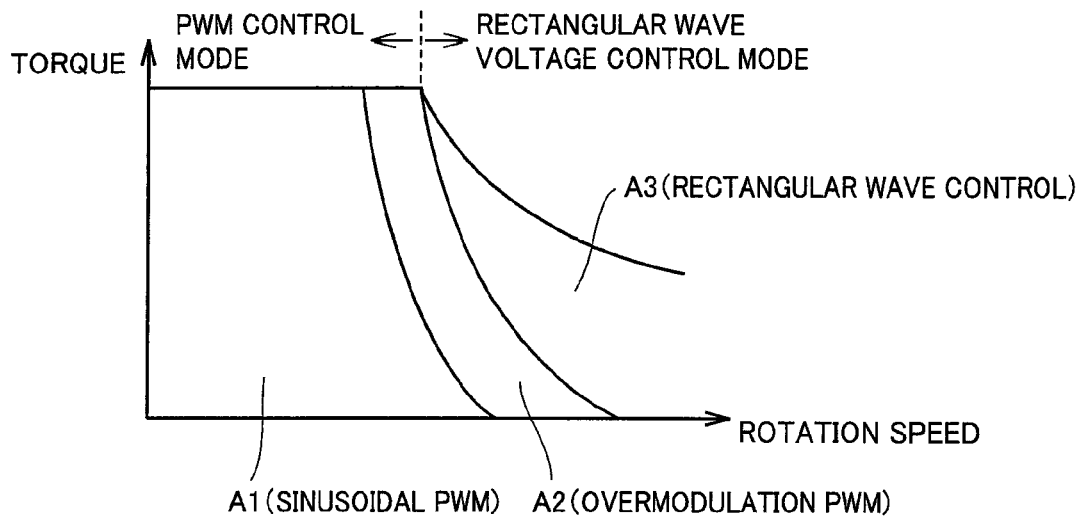

CONTROL DEVICE AND CONTROL METHOD FOR AC MOTOR

This is a 371 national phase application of PCT/JP2009/066922 filed 29 Sep. 2009, which claims priority to Japanese Patent Application No. 2008-254086 filed 30 Sep. 2008, the contents of which are incorporated herein by reference.

FIELD OF THE INVENTION

This invention relates to a control device and a control method for an AC motor.

More particularly, this invention relates to control of an AC motor to which pulse width modulation (PWM) control having a sinusoidal modulation mode and an overmodulation mode is applied.

BACKGROUND OF THE INVENTION

In order to drive and control an AC motor by using a DC power supply, there has been employed a drive method using an inverter. The inverter is subjected to switching control by an inverter drive circuit. For example, a voltage switched in accordance with PWM control is applied to the AC motor.

Further, Japanese Patent Laying-Open No. 2006-320039 (Patent Document 1) describes a motor drive system to which overmodulation PWM control and rectangular wave voltage control are applied as AC motor control by a modulation scheme, and the AC motor control is larger than sinusoidal PWM control with regard to a fundamental component of a motor applied voltage.

In particular, Patent Document 1 describes the following control. That is, when a motor rotation speed is changed rapidly at the time of application of the rectangular wave voltage control or the overmodulation PWM control, a voltage command value of an output voltage from a converter (i.e., an input voltage to an inverter) is changed depending on a change rate of the motor rotation speed so as to cover reduction in feedback control responsivity.

PRIOR ART DOCUMENTS

Patent Documents

Patent Document 1: Japanese Patent Laying-Open No. 2006-320039.

SUMMARY OF THE INVENTION

Problems to be Solved by the Invention

The overmodulation PWM control needs to improve controllability by appropriately addressing a harmonic component of an electric current since a waveform of a motor current is distorted under current feedback control for compensating d-axis and q-axis current deviations. In the control configuration of switching between the rectangular wave voltage control and the PWM control according to the state of the AC motor, moreover, the overmodulation PWM control is employed typically at the time of switchover from the rectangular wave voltage control to the PWM control. Consequently, the overmodulation PWM control needs to take stabilization of control operations into consideration even at the time of control mode switchover described above.

This invention has been devised to solve the problems described above. An object of this invention is to enhance control stability of overmodulation PWM control which is larger than sinusoidal PWM control with regard to a fundamental component of a motor applied voltage.

Means for Solving the Problems

An AC motor control device according to this invention is a control device for an AC motor having an applied voltage controlled by an inverter. This control device includes a current detector for detecting an electric current flowing between the inverter and the AC motor, and a pulse width modulation control unit. The pulse width modulation control unit is configured to generate a control command for the inverter under pulse width modulation control based on a comparison between an AC voltage command for operating the AC motor in accordance with an operation command and a carrier wave. Moreover, the pulse width modulation control unit includes a first control unit for generating the control command according to a deviation between a motor current based on a value detected by the current detector and a current command corresponding to the operation command, in accordance with a sinusoidal pulse width modulation scheme, and a second control unit for generating the control command according to a current deviation between the motor current and the current command, in accordance with an overmodulation pulse width modulation scheme for outputting an applied voltage having a fundamental component larger than that of an applied voltage in the sinusoidal pulse width modulation scheme. The second control unit includes a calculation unit, a first filter processing unit, an amplitude correction unit and a modulation unit. The calculation unit is configured to obtain the current deviation, based on the motor current and the current command, and to calculate a control value indicating the AC voltage command, according to the obtained current deviation. The first filter processing unit is configured to smooth a change of the calculated control value in a time axis direction. The amplitude correction unit is configured to perform correction calculation on the control value smoothed by the first filter processing unit, in order to enlarge an amplitude of the AC voltage command. The modulation unit is configured to convert the control value subjected to the correction calculation into the AC voltage command, and to generate the control command, based on the comparison between the AC voltage and the carrier wave.

An AC motor control method according to this invention is a control method for an AC motor having an applied voltage controlled by an inverter. This control method includes a step of controlling the AC motor under pulse width modulation control according to an overmodulation pulse width modulation scheme for outputting an applied voltage having a fundamental component larger than that of an applied voltage in a sinusoidal pulse width modulation scheme. The controlling step includes a step of obtaining a current deviation, based on a motor current based on a value detected by a current detector for detecting an electric current flowing between the inverter and the AC motor, and a current command corresponding to an operation command for the AC motor, and calculating a control value indicating an AC voltage command for operating the AC motor in accordance with the operation command, according to the current deviation, a step of smoothing a change of the calculated control value in a time axis direction, a step of performing correction calculation on the control value smoothed in the smoothing step, in order to enlarge an amplitude of the AC voltage command, a step of converting the control value subjected to the correction calculation into an AC voltage command, and a step of generating a control command for the inverter, based on a comparison between a carrier wave and the converted AC voltage command.

According to the AC motor control device or AC motor control method described above, the filtering process is performed, in the time axis direction, on a change of a control value indicating an AC voltage command at the time of application of the overmodulation PWM control under current feedback control (PWM control) based on a deviation between a motor current and a current command value. Therefore, it is possible to prevent both an amplitude and a phase of the AC voltage command from being changed rapidly. As a result, it is possible to prevent a motor applied voltage from being changed rapidly and to stabilize AC motor control under overmodulation PWM control, at the time of, typically, control mode switchover.

Preferably, the second control unit further includes a second filter processing unit for smoothing, in the time axis direction, a change of the motor current based on the value detected by the current detector. Moreover, the calculation unit is configured to obtain the current deviation, based on the current command and a motor current smoothed by the second filter processing unit. More preferably, a time constant in the smoothing by the first filter processing unit is larger than a time constant in the smoothing by the second filter processing unit. Alternatively, the controlling step further includes a step of smoothing, in the time axis direction, the change of the motor current based on the value detected by the current detector. The calculating step is configured to obtain the current deviation, based on the current command and the smoothed motor current. More preferably, a time constant in the smoothing of the control value is larger than a time constant in the smoothing of the motor current.

With this configuration, the filtering process (second filter processing unit) allows removal of a harmonic component from the motor current, which leads to stabilization of the overmodulation PWM control. In particular, it is possible to make the relation of the filtering process with an electric current and a voltage suitable and to stabilize the control in such a manner that the time constant in the filtering process (first filter processing unit) for the voltage command is set to be larger than that in the filtering process (second filter processing unit) for the motor current.

More preferably, the time constant in the smoothing by the second filter processing unit, that is, the time constant in the smoothing of the motor current is controlled to be predetermined integer times as large as an electrical cycle of the AC motor.

With this configuration, in consideration of a fact that a harmonic component to be superimposed on a motor current at the time of application of the overmodulation PWM control corresponds to an electrical cycle (a cycle of an electrical angle of 360 degrees) of the AC motor, it is possible to enhance an advantage of the filtering process (second filter processing unit) for the motor current.

Also preferably, the current command contains a d-axis current command value and a q-axis current command value. Moreover, the control value contains a d-axis voltage command value and a q-axis voltage command value each calculated based on the current deviation relative to each of the d-axis current command value and the q-axis current command value. Further, the first filter processing unit or the step of smoothing the control value is configured to smooth changes of the d-axis voltage command value and the q-axis voltage command value in the time axis direction.

With this configuration, in the AC motor control for performing current feedback on a d-axis current command value and a q-axis current command value, it is possible to enhance the stability of the overmodulation PWM control by performing the filtering process directly on a d-axis voltage command value and a q-axis voltage command value.

Also preferably, the current command contains a d-axis current command value and a q-axis current command value. Moreover, the control value contains a d-axis voltage command value and a q-axis voltage command value each calculated based on the current deviation relative to each of the d-axis current command value and the q-axis current command value. Further, the first filter processing unit or the step of smoothing the control value is configured to smooth, in the time axis direction, changes of a voltage command amplitude and a voltage command phase each indicated by a combination of the d-axis voltage command value and the q-axis voltage command value.

With this configuration, it is possible to enhance the stability of the overmodulation PWM control by performing the filtering process after the conversion of the d-axis and q-axis voltage command values into the amplitude and phase of the AC voltage command.

Preferably, the control device further includes a rectangular wave voltage control unit and a mode switchover determination unit. The rectangular wave voltage control unit is configured to generate a control command for the inverter such that a rectangular wave voltage subjected to phase control so as to operate the AC motor in accordance with an operation command is applied to the rectangular wave voltage control unit and the AC motor. The mode switchover determination unit is configured to select one of the pulse width modulation control and rectangular wave voltage control by the rectangular wave voltage control unit, according to a control state of the AC motor. Moreover, the calculation unit is configured to reduce an amount of change in the control value relative to the identical current deviation in the case of the calculation of the control value at the time of control mode switchover from the rectangular wave voltage control to pulse width modulation control in accordance with the overmodulation pulse width modulation scheme as compared with the calculation of the control value after the switchover of the control mode.

With this configuration, it is possible to prevent an AC voltage command from being changed largely at the time of switchover from the rectangular wave voltage control to the overmodulation PWM control. Hence, it is possible to enhance the stability of the overmodulation PWM control at the time of control mode switchover.

Also preferably, the control device further includes the rectangular wave voltage control unit and the mode switchover determination unit. The calculation unit is configured to obtain the control value by calculation in which the current command is substituted in a characteristic equation for the AC motor, in place of the calculation based on the current deviation, at the time of control mode switchover from the rectangular wave voltage control to pulse width modulation control in accordance with the overmodulation pulse width modulation scheme.

With this configuration, it is possible to prevent an AC voltage command, caused by a rapid change of a current deviation relative to a current command value, from being changed rapidly at the time of switchover from the rectangular wave voltage control to the overmodulation PWM control. Hence, it is possible to enhance the stability of the overmodulation PWM control at the time of control mode switchover.

Also preferably, the current command contains a d-axis current command value and a q-axis current command value, and the control value contains a d-axis voltage command value and a q-axis voltage command value each calculated based on the current deviation relative to each of the d-axis current command value and the q-axis current command value. Moreover, the calculation unit is configured to obtain the d-axis voltage command value and the q-axis voltage command value while limiting the q-axis voltage command value within a range which does not exceed a counter electromotive voltage at an existing rotation speed of the AC motor.

With this configuration, it is possible to prevent, with reliability, an AC voltage command to invert the polarity of a d-axis current from being changed rapidly. Hence, it is possible to prevent the occurrence of a torque variation in the AC motor.

Effects of the Invention

According to the present invention, it is possible to enhance control stability of overmodulation PWM control which is larger than sinusoidal PWM control with regard to a fundamental component of a motor applied voltage.

BRIEF DESCRIPTION OF THE DRAWINGS

FIG. 2 is a diagram illustrating schematically a control mode of an AC motor in the motor drive system according to the embodiment of the present invention.

FIG. 3 is a diagram illustrating a correspondence between an operating state of the AC motor and the control mode shown in FIG. 2.

DETAILED DESCRIPTION

Figure 1:
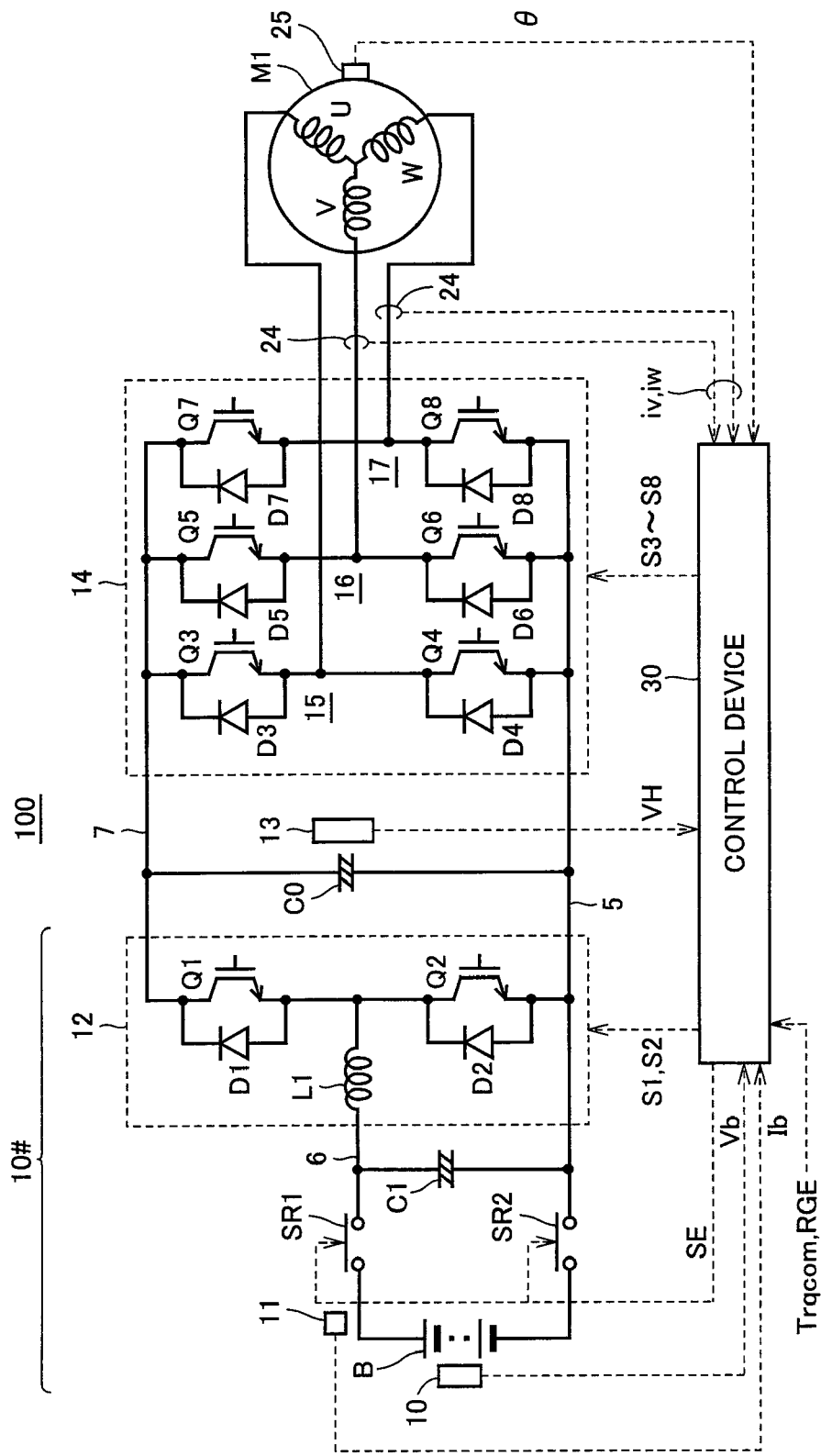
FIG. 1 is a general configuration diagram of a motor drive and control system to which an AC motor control device and an AC motor control method according to an embodiment of the present invention are applied.

Embodiments of the present invention will be described below in detail with reference to the drawings. It is to be noted that the same or corresponding portions in the drawings are denoted with the same reference signs, and therefore the description thereof will not be repeated in principle.

(General Configuration of Motor Control)

FIG. 1 is a general configuration diagram of a motor drive and control system to which an AC motor control device according to an embodiment of the present invention is applied.

With reference to FIG. 1, a motor drive and control system 100 includes a DC voltage generation unit 10#, a smoothing capacitor C0, an inverter 14, an AC motor M1 and a control device 30.

AC motor M1 is, for example, a traction motor for generating torque to drive driving wheels of an electric powered vehicle (which refers to automobiles configured to generate vehicle driving force with electrical energy, such as a hybrid car, an electric car and a fuel cell car). Alternatively, AC motor M1 may be configured to have functions of a generator to be driven by an engine, or may be configured to have both functions of a motor and functions of a generator. Further, AC motor M1 may operate as a motor for an engine. For example, AC motor M1 may be incorporated in a hybrid car so as to allow an engine start. That is, in this embodiment, the "AC motor" involves AC driving motors, generators and motor-generators.

DC voltage generation unit 10# includes a DC power supply B, system relays SR1 and SR2, a smoothing capacitor C1, and a step-up and step-down converter 12.

Typically, DC power supply B is configured with a power storage device such as a secondary battery made of nickel metal hydride, lithium ion or the like, as well as an electric double layer capacitor, etc. A DC voltage Vb to be output from DC power supply B and a DC current Ib to be input to and output from DC power supply B are detected by a voltage sensor 10 and a current sensor 11, respectively.

System relay SR1 is connected between a positive terminal of DC power supply B and a power line 6, and system relay SR2 is connected between an negative terminal of DC power supply B and an earth line 5. Each of system relays SR1 and SR2 is turned on or off, based on a signal SE from control device 30.

Step-up and step-down converter 12 includes a reactor L1, power semiconductor switching elements Q1 and Q2, and diodes D1 and D2. Power semiconductor switching elements Q1 and Q2 are connected in series between a power line 7 and earth line 5. Power semiconductor switching elements Q1 and Q2 are turned on or off under the control using switching control signals S1 and S2 from control device 30.

In the embodiment of this invention, an IGBT (Insulated Gate Bipolar Transistor), a power MOS (Metal Oxide Semiconductor) transistor, a power bipolar transistor or the like can be used as the power semiconductor switching element (hereinafter, simply referred to as "switching element"). Antiparallel diodes D1 and D2 are arranged for switching elements Q1 and Q2. Reactor L1 is connected between power line 6 and a connection node between switching elements Q1 and Q2. Moreover, smoothing capacitor C0 is connected between power line 7 and earth line 5.

Inverter 14 includes a U-phase vertical arm 15, a V-phase vertical arm 16 and a W-phase vertical arm 17 provided in parallel between power line 7 and earth line 5. Each phase vertical arm is configured with switching elements connected in series between power line 7 and earth line 5. For example, U-phase upper and lower arms 15 includes switching elements Q3 and Q4, V-phase upper and lower arms 16 includes switching elements Q5 and Q6, and W-phase upper and lower arms 17 includes switching elements Q7 and Q8. Moreover, antiparallel diodes D3 to D8 are connected to switching elements Q3 to Q8, respectively. Switching elements Q3 to Q8 are turned on or off under the control using switching control signals S3 to S8 from control device 30.

Typically, AC motor M1 is a three-phase permanent magnet-type synchronous motor in which one ends of three coils, that is, a U-phase coil, a V-phase coil and a W-phase are connected in common to a neutral point. Further, the other ends of the respective coils are connected to intermediate points between the switching elements of phase upper and lower arms 15 to 17, respectively.

In a voltage step-up operation, step-up and step-down converter 12 supplies, to inverter 14, a DC voltage VH obtained by stepping up a DC voltage Vb supplied from DC power supply B (hereinafter, this DC voltage corresponding to an input voltage to inverter 14 will be referred to as "system voltage"). More specifically, an ON period of switching element Q1 and an ON period of switching element Q2 (or a period that both switching elements Q1 and Q2 are turned off) are provided alternately in response to switching control signals S1 and S2 from control device 30, and a voltage step-up ratio corresponds to a ratio of these ON periods. Alternatively, a relation of VH=Vb (voltage step-up ratio=1.0) can be established in such a manner that switching elements Q1 and Q2 are fixedly turned on and off, respectively.

In a voltage step-down operation, moreover, step-up and step-down converter 12 charges DC power supply B by stepping down DC voltage VH (system voltage) supplied from inverter 14 through smoothing capacitor C0. More specifically, the period that only switching element Q1 is turned on and the period that both switching elements Q1 and Q2 are turned off (or the ON period of switching element Q2) are provided alternately in response to switching control signals S1 and S2 from control device 30, and a voltage step-down ratio corresponds to a duty ratio in the ON period.

Smoothing capacitor C0 smoothes the DC voltage from step-up and step-down converter 12, and then supplies the smoothed DC voltage to inverter 14. Voltage sensor 13 detects the voltage across smoothing capacitor C0, that is, system voltage VH, and then outputs a value of the detected voltage to control device 30.

In a case where AC motor M1 has a positive torque command value (Trqcom>0), when the DC voltage is supplied from smoothing capacitor C0 to inverter 14, inverter 14 drives AC motor M1 to output a positive torque by converting the DC voltage into an AC voltage, based on switching operations of switching elements Q3 to Q8, and these switching operations are performed in response to switching control signals S3 to S8 from control device 30. Moreover, in a case where the torque command value of AC motor M1 is zero (Trqcom=0), inverter 14 drives AC motor M1 to set the torque at zero by converting the DC voltage into an AC voltage, based on the switching operations to be performed in response to switching control signals S3 to S8. Thus, AC motor M1 is driven to generate the torque of zero or the positive torque designated by torque command value Trqcom.

Further, in a case of regenerative braking of an electric powered vehicle equipped with motor drive and control system 100, AC motor M1 has a negative torque command value Trqcom (Trqcom<0). In this case, inverter 14 converts the AC voltage generated by AC motor M1 into a DC voltage, based on the switching operations performed in response to switching control signals S3 to S8, and then supplies the converted DC voltage (system voltage) to step-up and step-down converter 12 through smoothing capacitor C0. It is to be noted that the regenerative braking to be used herein involves braking associated with regenerative power generation in a case where a driver who drives the electric powered vehicle operates a foot brake, and decelerating of the vehicle (or a stop of acceleration) associated with regenerative power generation in such a manner that the driver does not operate the foot brake, but releases an acceleration pedal at the time of running of the vehicle.

Current sensor 24 detects an electric current flowing through AC motor M1, and then outputs a value of the detected electric current to control device 30. Herein, since a sum of instantaneous values of three-phase currents iu, iv and iw is zero, as shown in FIG. 1, it is sufficient to arrange current sensor 24 such that current sensor 24 detects two of the three-phase currents (e.g., V-phase current iv and W-phase current iw).

A rotation angle sensor (resolver) 25 detects a rotor rotation angle θ of AC motor M1, and then sends detected rotation angle θ to control device 30. Control device 30 can calculate a rotation speed and an angular velocity ω (rad/s) of AC motor M1, based on rotation angle θ. It is to be noted that rotation angle sensor 25 may not be provided in such a manner that control device 30 directly calculates rotation angle θ from a motor voltage or a motor current.

Control device 30 is configured with an electronic control unit (ECU), and controls the operations of motor drive and control system 100 through software processing realized by executing prestored programs using a CPU (Central Processing Unit) (not shown) and/or hardware processing with dedicated electronic circuitry.

As a typical function, control device 30 controls operations of step-up and step-down converter 12 and inverter 14 such that AC motor M1 outputs a torque according to torque command value Trqcom in accordance with a control scheme to be described later, based on received torque command value Trqcom, DC voltage Vb detected by voltage sensor 10, DC current Ib detected by current sensor 11, system voltage VH detected by voltage sensor 13, motor currents iv and iw from current sensor 24, rotation angle θ from rotation angle sensor 25, and the like. That is, control device 30 generates switching control signals S1 to S8 in order to control step-up and step-down converter 12 and inverter 14 as described above, and then outputs these generated signals to step-up and step-down converter 12 and inverter 14.

At the time of the voltage step-up operation by step-up and step-down converter 12, control device 30 performs feedback control on system voltage VH, and generates switching control signals S1 and S2 such that system voltage VH matches with a voltage command value.

Moreover, when receiving from an external ECU a signal RGE indicating that the electric powered vehicle is in a regenerative braking mode, control device 30 generates switching control signals S3 to S8 so as to convert the AC voltage generated by AC motor M1 into a DC voltage, and then outputs these generated signals to inverter 14. Thus, inverter 14 converts the AC voltage generated by AC motor M1 into the DC voltage, and then supplies the DC voltage to step-up and step-down converter 12.

Further, when receiving from the external ECU signal RGE indicating that the electric powered vehicle is in the regenerative braking mode, control device 30 generates switching control signals S1 and S2 so as to step down the DC voltage supplied from inverter 14, and then outputs these generated signals to step-up and step-down converter 12. Thus, the AC voltage generated by AC motor M1 is converted into a DC voltage, stepped down, and supplied to DC power supply B.

(Description of Control Mode)

The control of AC motor M1 by control device 30 will be described in more detail.

FIG. 2 is a diagram illustrating schematically a control mode of AC motor M1 in the motor drive system according to the embodiment of the present invention.

As shown in FIG. 2, motor drive and control system 100 according to the embodiment of the present invention performs the control of AC motor M1, that is, the power conversion in inverter 14 in three control modes which are switchable.

Sinusoidal PWM control is used as typical PWM control, and the ON states or OFF states of the respective upper and lower arm elements are controlled in accordance with a comparison in voltage between a sine wave-shaped voltage command and a carrier wave (typically, a triangular wave). As a result, with regard to an aggregation of a HIGH level period corresponding to the ON period of the upper arm element and a LOW level period corresponding to the ON period of the lower arm element, a duty is controlled such that the fundamental component is turned into a sine wave within a certain period. As is known well, in the sinusoidal PWM control in which an amplitude of the sine wave-shaped voltage command is limited to a range which is not more than an amplitude of the carrier wave, a fundamental component of a voltage to be applied to AC motor M1 (hereinafter, simply referred to as "motor applied voltage") can not be increased to, at most, about 0.61 times as large as a DC link voltage of an inverter. In this description, hereinafter, a ratio of the fundamental component (effective value) with the motor applied voltage (line-to-line voltage) relative to the DC link voltage of inverter 14 (i.e., system voltage VH) is referred to as a "modulation ratio".

In the sinusoidal PWM control, since the amplitude of the sine wave voltage command is in the range which is not more than the carrier wave amplitude, a line-to-line voltage applied to AC motor M1 is sinusoidal. Moreover, there is also proposed a control scheme for generating a voltage command by superimposing a 3n-order harmonic component (n: a natural number, typically a tertiary harmonic wave in a case of n=1) on a sine wave component in the range which is not more than the amplitude of the carrier wave. In this control scheme, a period during which the voltage command becomes higher than the carrier wave amplitude because of the harmonic component occurs. However, since the 3n-order harmonic component superimposed on each phase is canceled between the lines, the sinusoidal line-to-line voltage is maintained. In this embodiment, the sinusoidal PWM control also involves this control scheme.

On the other hand, in rectangular wave voltage control, one pulse of a rectangular wave in which a ratio between a HIGH level period and a LOW level period is 1:1 is applied to the AC motor within the certain period described above. Thus, the modulation ratio can be increased to 0.78.

In overmodulation PWM control, PWM control similar to the sinusoidal PWM control described above is performed within a range where an amplitude of a voltage command (sine wave component) is larger than the amplitude of the carrier wave. In particular, the fundamental component can be increased in such a manner that the voltage command is distorted from the original sine wave waveform (amplitude correction). The modulation ratio can be increased to a range from a maximum modulation ratio in the sinusoidal PWM control mode to 0.78. In the overmodulation PWM control, since the amplitude of the voltage command (sine wave component) is larger than the amplitude of the carrier wave, the line-to-line voltage to be applied to AC motor M1 becomes a distorted voltage rather than a sine wave voltage.

In AC motor M1, as the rotation speed or output torque increases, an induced voltage becomes high. Therefore, a drive voltage to be required (motor required voltage) becomes high. The voltage stepped up by converter 12, that is, system voltage VH needs to be set higher than this motor required voltage. However, the voltage stepped up by converter 12, that is, system voltage VH has a limit value (VH maximum voltage).

In response to the operating state of AC motor M1, accordingly, one of the PWM control mode under the sinusoidal PWM control or the overmodulation PWM control and the rectangular wave voltage control mode is applied selectively for controlling the amplitude and phase of the motor applied voltage (AC) by the feedback of the motor current. In the rectangular wave voltage control, since the amplitude of the motor applied voltage is fixed, the torque control is executed by the phase control for the rectangular wave voltage pulse, based on the deviation between the torque actual value and the torque command value.

FIG. 3 shows a correspondence between the operating state of AC motor M1 and the control mode described above.

With reference to FIG. 3, in general, the sinusoidal PWM control is used in a low rotation speed area A1 in order to reduce the torque variation, the overmodulation PWM control is applied to a middle rotation speed area A2, and the rectangular wave voltage control is applied to a high rotation speed area A3. In particular, the application of the overmodulation PWM control and rectangular wave voltage control realizes an improvement of output from AC motor M1. As described above, determination as to which control mode shown in FIG. 2 is used is basically made within a range of a realizable modulation ratio.

(Description of Control Configuration in Each Control Mode)

Figure 4:
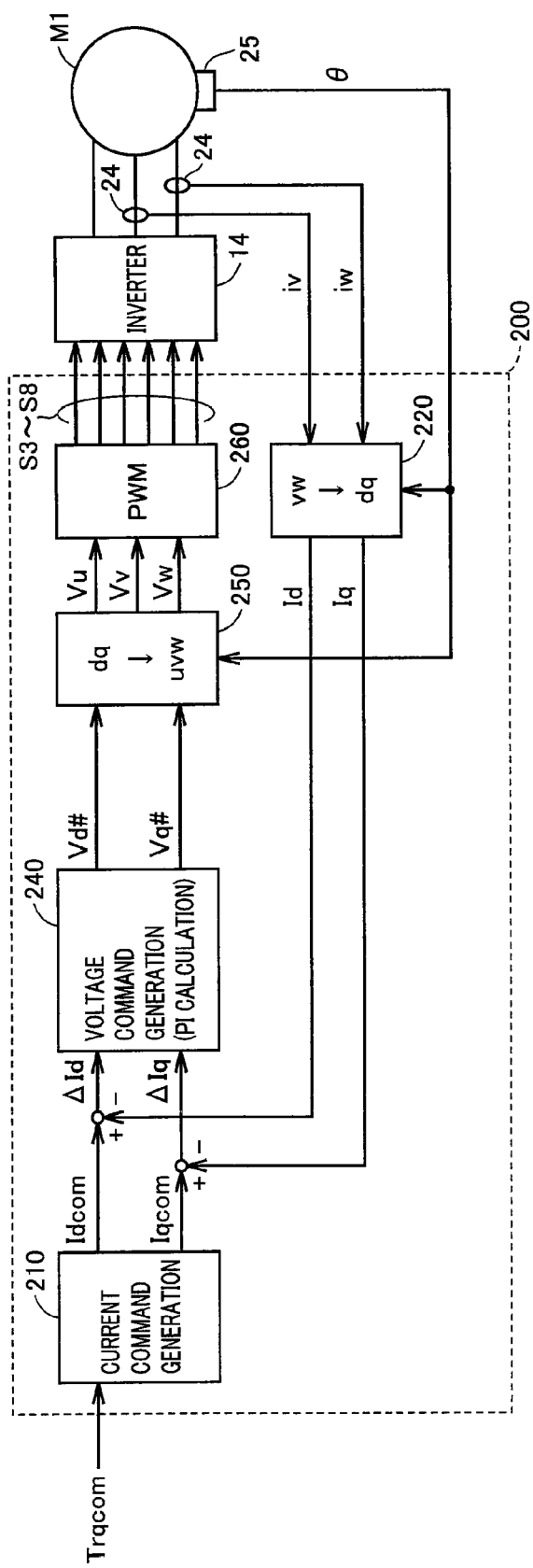
FIG. 4 is a block diagram illustrating a motor control configuration under sinusoidal PWM control in the AC motor control device according to the embodiment of the present invention.

FIG. 4 is a block diagram illustrating a motor control configuration under the sinusoidal PWM control, which is a basic control configuration by the AC motor control device according to the embodiment of the present invention. Functional blocks for motor control in the following block diagrams including FIG. 4 are realized by hardware or software processing to be executed by control device 30.

With reference to FIG. 4, at the time when the sinusoidal PWM control mode is selected, a sinusoidal PWM control unit 200 generates switching control signals S3 to S8 for inverter 14 such that AC motor M1 outputs a torque according to torque command value Trqcom.

Sinusoidal PWM control unit 200 includes a current command generation unit 210, coordinate conversion units 220 and 250, a voltage command generation unit 240, and a PWM modulation unit 260.

Current command generation unit 210 generates a d-axis current command value Idcom and a q-axis current command value Iqcom according to torque command value Trqcom of AC motor M1, in accordance with a table prepared in advance, or the like.

Coordinate conversion unit 220 calculates a d-axis current Id and a q-axis current Iq, based on v-phase current iv and W-phase current iw detected by current sensor 24, in accordance with coordinate conversion (dq transformation) using rotation angle θ of AC motor M1 to be detected by rotation angle sensor 25.

Voltage command generation unit 240 receives a deviation ΔId (ΔId=Idcom−Id) relative to a d-axis current command value and a deviation ΔIq (ΔIq=Iqcom−Iq) relative to a q-axis current command value. With regard to each of d-axis current deviation ΔId and q-axis current deviation ΔIq, voltage command generation unit 240 performs PI (Proportional Integral) calculation based on a predetermined gain to obtain a control deviation, and then generates a d-axis voltage command value Vd# and a q-axis voltage command value Vq# according to the control deviations.

Coordinate conversion unit 250 converts d-axis voltage command value Vd# and q-axis voltage command value Vq# into a U-phase voltage command Vu, a V-phase voltage command Vv and a W-phase voltage command Vw through coordinate conversion (dq inverse transformation) using rotation angle θ of AC motor M1.

Figure 5:
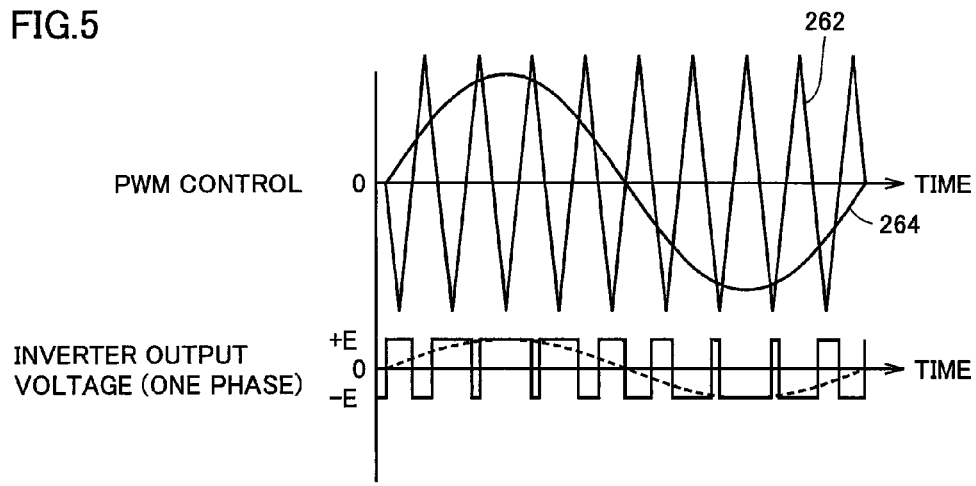
FIG. 5 is a waveform chart illustrating an operation of a PWM modulation unit in FIG. 4.

As shown in FIG. 5, PWM modulation unit 260 generates a pseudo sine wave voltage on each phase of AC motor M1 by controlling the ON states and OFF states of the upper and lower arm elements in each phase of inverter 14, based on a comparison between carrier wave 262 and AC voltage command 264 (that comprehensively indicates Vu, Vv and Vw). Carrier wave 262 is configured with a triangular wave or a saw wave in a predetermined frequency. As described above, it is also possible to superimpose the 3n-order harmonic wave on the sine wave AC voltage command.

In PWM modulation for inverter control, the amplitude of carrier wave 262 corresponds to the input DC voltage (system voltage VH) of inverter 14. However, when the amplitude of AC voltage command 264 to be subjected to PWM modulation is converted into a result of division of the amplitudes of original phase voltage commands Vu, Vv and Vw by system voltage VH, the amplitude of carrier wave 262 for use in PWM modulation unit 260 can be fixed.

With reference to FIG. 4 again, when inverter 14 is subjected to switching control in accordance with switching control signals S3 to S8 generated by PWM control unit 200, an AC voltage for outputting a torque according to torque command value Trqcom to AC motor M1 is applied to inverter 14.

Figure 6:
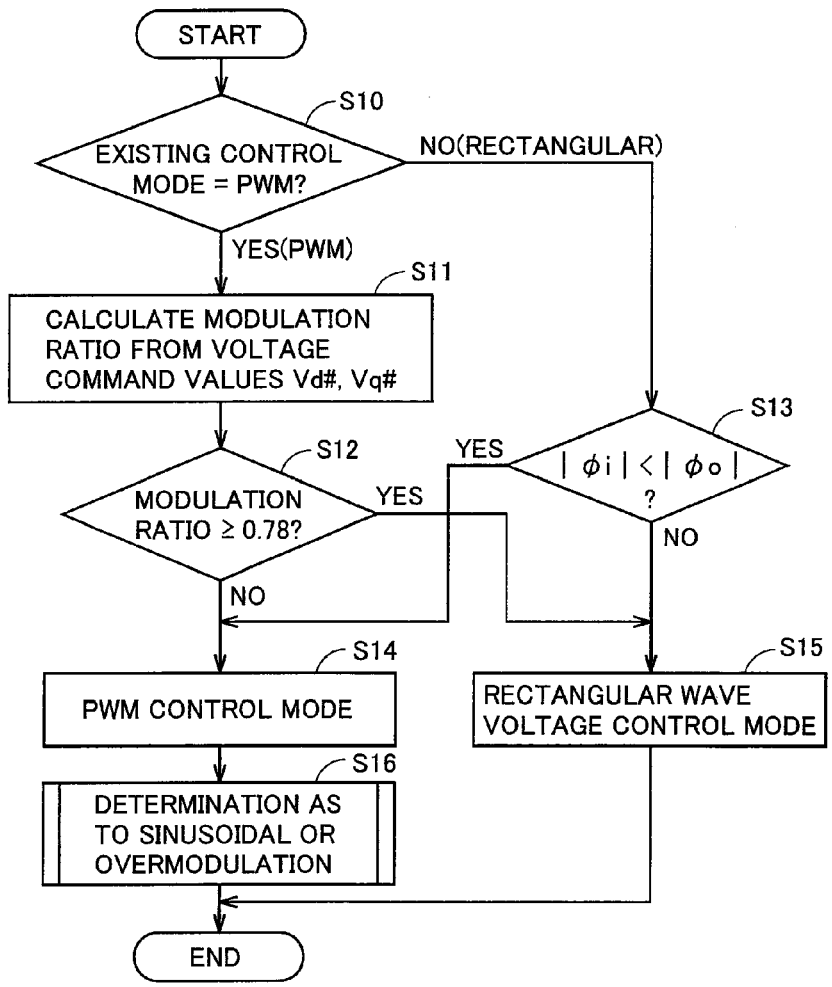
FIG. 6 is a flowchart illustrating a control mode switchover determining process in the AC motor control device according to the embodiment of the present invention.

With reference to FIG. 6, next, a process of determining the switchover of the control mode between the sinusoidal PWM control and the remaining control schemes will be described.

With reference to FIG. 6, in step S10, control device 30 determines whether the existing control mode is the PWM control mode. Next, when the existing control mode is the PWM control mode (at the time of determination as YES in S10), in step S11, control device 30 calculates a modulation ratio in the case where input voltage VH of inverter 14 is converted into the motor applied voltage to AC motor M1, based on voltage command values Vd# and Vq# according to the PWM control mode as well as system voltage VH.

For example, modulation ratio FM is calculated using the following expression (1).

$$FM=(Vd\#^2+Vq\#^2)^{1/2}/VH \qquad (1)$$

Next, in step S12, control device 30 determines whether the modulation ratio obtained in step S11 is not less than 0.78. When the modulation ratio is not less than 0.78 (at the time of determination as YES in S12), an appropriate AC voltage cannot be generated in the PWM control mode. Therefore, control device 30 proceeds the process to step S15 and switches the control mode so as to select the rectangular wave voltage control mode.

On the other hand, at the time of determination as NO in step S12, that is, when the modulation ratio obtained in step S11 is less than 0.78, in step S14, control device 30 continuously selects the PWM control mode.

On the other hand, when the existing control mode is the rectangular wave voltage control mode (at the time of determination as NO in S10), in step S13, control device 30 monitors whether or not an absolute value of an AC current phase (actual current phase) φi to be supplied from inverter 14 to AC motor M1 is smaller than an absolute value of a predetermined switchover current phase φ0. It is to be noted that switchover current phase φ0 may be set at different values at the time of powering and regenerating in AC motor M1.

When the absolute value of actual current phase φi is smaller than the absolute value of switchover current phase φ0 at the time of determination as YES in S13), control device 30 determines the switchover of the control mode from the rectangular wave voltage control mode to the PWM control. In this case, in step S14, control device 30 selects the PWM control mode.

On the other hand, at the time of determination as NO in step S11, that is, when the absolute value of actual current phase φi is not less than the absolute value of switchover current phase φ0, in step S15, control device 30 keeps the control mode at the rectangular wave voltage control mode.

At the time of selection of the PWM control mode (S14), in step S16, control device 30 further determines which one of the sinusoidal PWM control and the overmodulation PWM control is applied. This determination may be carried out by a comparison between modulation ratio FM and a predetermined threshold value (e.g., 0.61 which is a theoretical maximum value of the modulation ratio in the sinusoidal PWM control).

When the modulation ratio is not more than the threshold value, that is, when the PWM control in which the amplitude of AC voltage command 264 (sine wave component) is not more than the amplitude of carrier wave 262 can be realized, the sinusoidal PWM control is applied. In contrast, when the modulation ratio is larger than the threshold value, that is, when the amplitude of AC voltage command 264 (sine wave component) is larger than the amplitude of carrier wave 262, the overmodulation PWM control is applied. That is, sinusoidal PWM control unit 200 shown in FIG. 4 corresponds to a "first control unit".

As described above, it is possible to execute the control mode switchover determining process, based on the motor current detected by current sensor 24, input voltage (system voltage) VH of inverter 14 detected by voltage sensor 13, and voltage command values Vd# and Vq# generated by voltage command generation unit 240.

Figure 7:
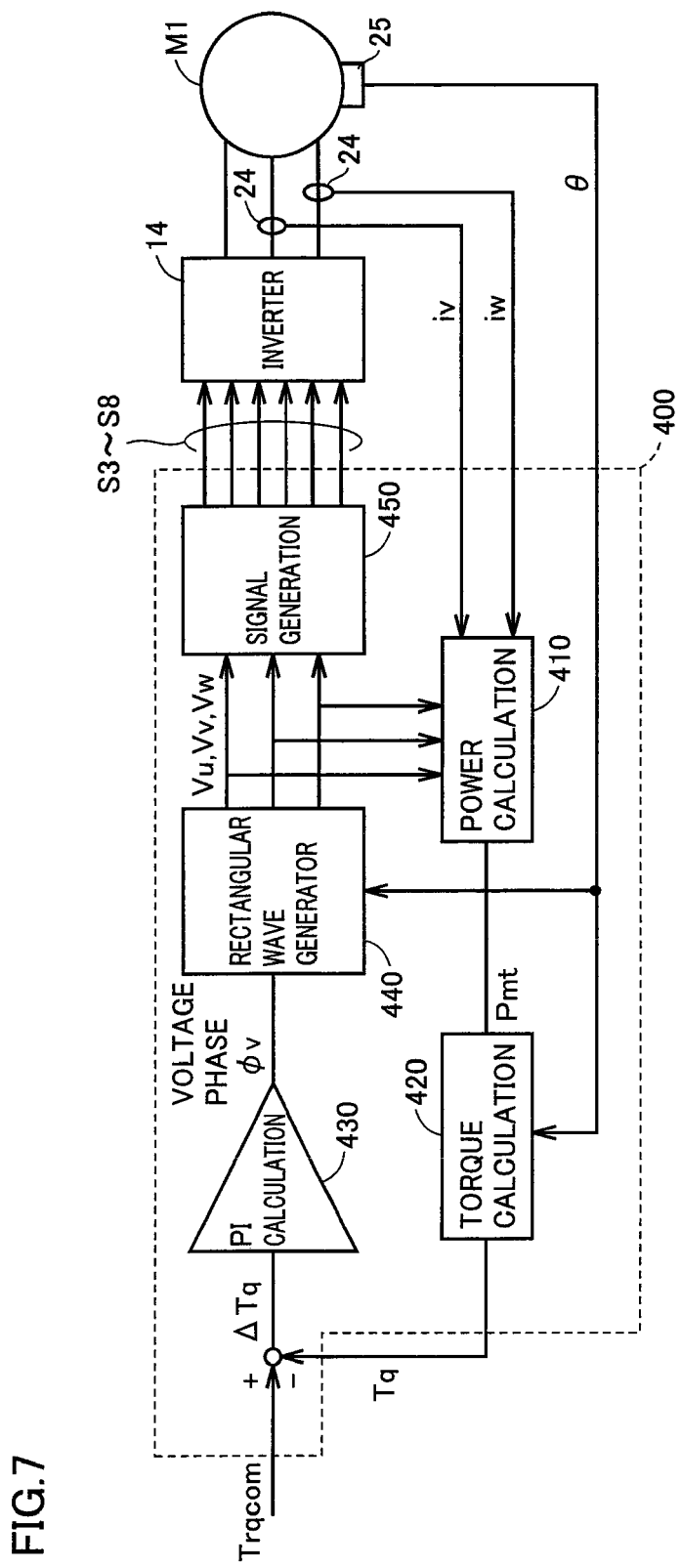
FIG. 7 is a block diagram illustrating a motor control configuration under rectangular wave voltage control in the AC motor control device according to the embodiment of the present invention.

FIG. 7 is a block diagram illustrating a motor control configuration under the rectangular wave voltage control to be executed in the case where the rectangular wave voltage control mode is applied by execution of the control mode switchover determining process shown in FIG. 6.

With reference to FIG. 7, a rectangular wave voltage control unit 400 includes a power calculation unit 410, a torque calculation unit 420, a PI calculation unit 430, a rectangular wave generator 440 and a signal generation unit 450.

Power calculation unit 410 calculates a supply power (motor power) Pmt to the motor in accordance with the following expression (2), based on the phase currents obtained from V-phase current iv and W-phase current iw by current sensor 24, and phase (U-phase, V-phase, W-phase) voltages Vu, Vv and Vw.

$$Pmt = iu \cdot Vu + iv \cdot Vv + iw \cdot Vw \quad (2)$$

Torque calculation unit 420 calculates a torque estimated value Tq in accordance with the following expression (3) using an angular velocity ω calculated from rotation angle θ of AC motor M1 detected by rotation angle sensor 25 and motor power Pmt obtained by power calculation unit 410.

$$Tq = Pmt/\omega \quad (3)$$

PI calculation unit 430 receives a torque deviation ΔTq (ΔTq=Trqcom−Tq) relative to torque command value Trqcom. PI calculation unit 430 performs PI calculation using a predetermined gain on torque deviation ΔTq to obtain a control deviation, and then sets a phase φv of a rectangular wave voltage according to the obtained control deviation. Specifically, at the time of generation of a positive torque (Trqcom>0), the voltage phase is advanced when the torque is short, but is retarded when the torque is excessive. On the other hand, at the time of generation of a negative torque (Trqcom<0), the voltage phase is retarded when the torque is short, but is advanced when the torque is excessive.

Rectangular wave generator 440 generates phase voltage command values (rectangular wave pulses) Vu, Vv and Vw, in accordance with voltage phase φv set by PI calculation unit 430. Signal generation unit 450 generates switching control signals S3 to S8 in accordance with phase voltage command values Vu, Vv and Vw. When inverter 14 performs switching operations according to switching control signals S3 to S8, the rectangular wave pulse according to voltage phase φv is applied as a phase voltage of the motor.

As described above, at the time of the rectangular wave voltage control scheme, it is possible to perform motor torque control under feedback control of torque (power). However, in the rectangular wave voltage control scheme, since the operation amount of the motor applied voltage involves only a phase, the control responsivity is reduced as compared with the PWM control scheme in which the operation amount involves the amplitude and phase of the motor applied voltage. Moreover, in the power calculation (the expression (2)) by power calculation unit 410, a filtering process is executed additionally for removing a distorted component from the detected motor current (iv, iw).

Herein, a torque sensor may be provided in place of power calculation unit 410 and torque calculation unit 420 to obtain torque deviation ΔTq based on a value detected thereby.

Figure 8:
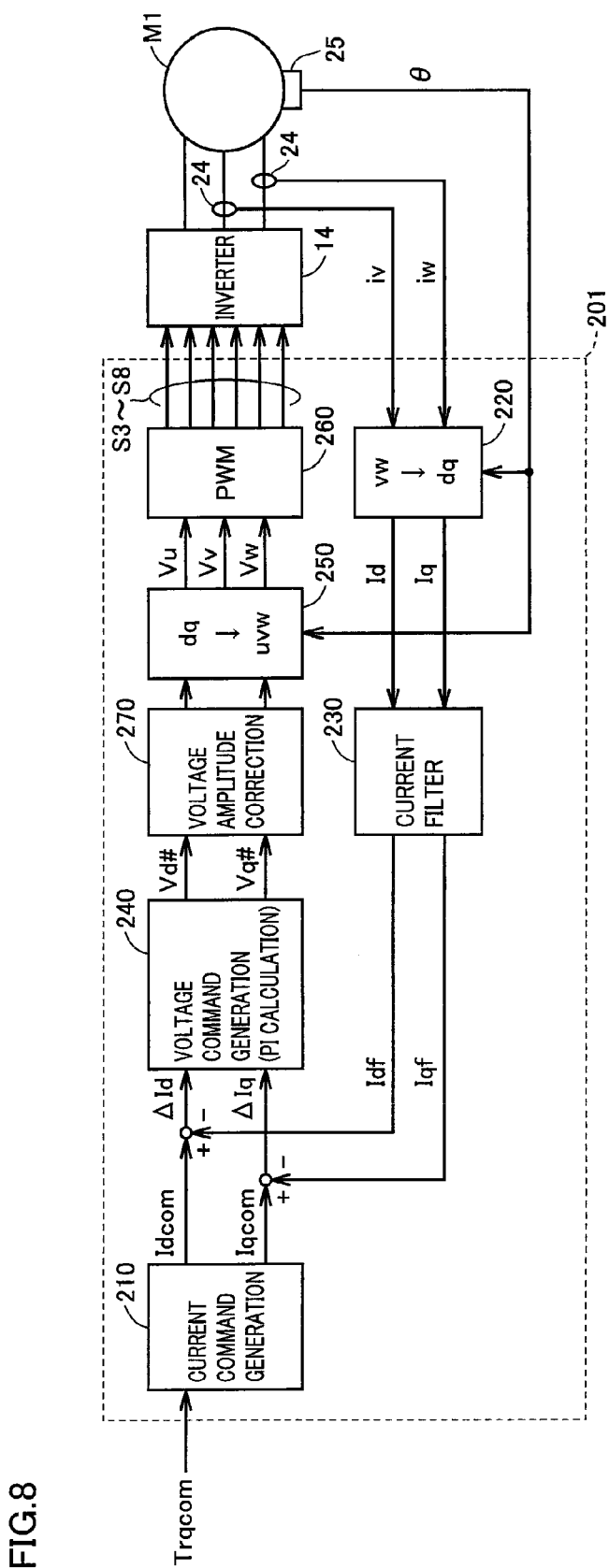
FIG. 8 is a block diagram illustrating a typical example of a motor control configuration under overmodulation PWM control.

Further, FIG. 8 shows a block diagram illustrating a typical example of a motor control configuration under the overmodulation PWM control.

With reference to FIG. 8, an overmodulation PWM control unit 201 includes a current filter 230 and a voltage amplitude correction unit 270 in addition to the configuration of sinusoidal PWM control unit 200 shown in FIG. 4.

Current filter 230 executes a process for smoothing, in a time axis direction, a d-axis current Id and a q-axis current Iq calculated by coordinate conversion unit 220. Thus, actual currents Id and Iq based on sensor detected values are converted into currents Idf and Iqf subjected to the filtering process.

Moreover, overmodulation PWM control unit 201 calculates current deviations ΔId and ΔIq from currents Idf and Iqf subjected to the filtering process. That is, relations of ΔId=Idcom−Idf and ΔIq=Iqcom−Iqf are established.

Voltage amplitude correction unit 270 executes a correcting process on original d-axis voltage command value Vd# and q-axis voltage command value Vq# calculated by voltage command generation unit 240, in order to enlarge the amplitude of the motor applied voltage. Coordinate conversion unit 250 and modulation unit 260 generate switching control signals S3 to S8 for inverter 14, in accordance with the voltage command subjected to the correcting process by voltage amplitude correction unit 270.

It is to be noted that, at the time of application of the overmodulation PWM control, amplitudes of phase voltage commands obtained by dq inverse transformation of voltage command values Vd# and Vq# become larger than an inverter input voltage (system voltage VH). This state corresponds to a state in which the amplitude of AC voltage command 264 is larger than the amplitude of carrier wave 262, in the waveform chart shown in FIG. 5. In this state, inverter 14 fails to apply a voltage exceeding system voltage VH to AC motor M1. Consequently, the PWM control using the phase voltage command signals according to original voltage command values Vd# and Vq# fails to ensure original modulation ratios corresponding to voltage command values Vd# and Vq#.

For this reason, the execution of the correcting process for enlarging (×k times, k>1) the voltage amplitude so as to increase a voltage application section with regard to the AC voltage commands based on voltage command values Vd# and Vq# is allowed to ensure the original modulation ratios based on voltage command values Vd# and Vq#. It is to be noted that an enlargement ratio k of the voltage amplitude in voltage amplitude correction unit 270 can be derived theoretically from the original modulation ratio.

(Problems in Overmodulation PWM Control)

Figure 9:
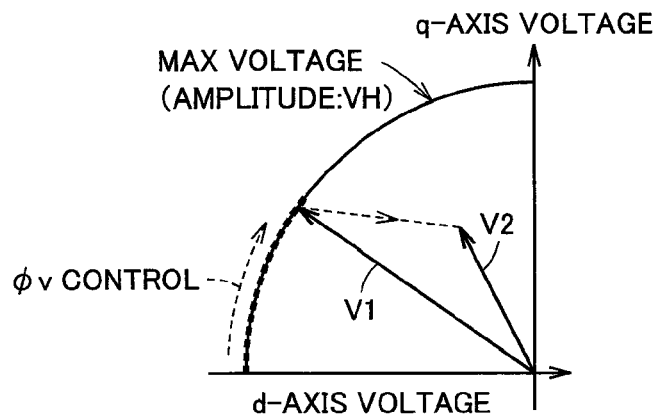
FIG. 9 is a diagram illustrating a change of an AC voltage command at the time of switchover from the rectangular wave voltage control to the overmodulation PWM control (a comparative example).
Figure 10:
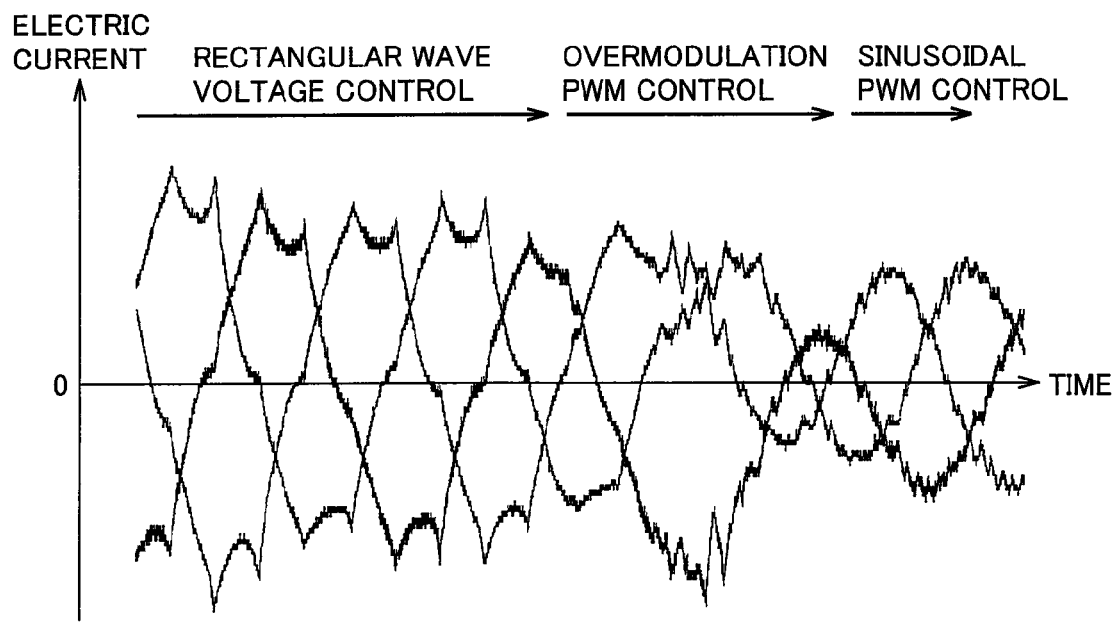
FIG. 10 is a waveform chart showing one example of a current variation at the time of control mode switchover.
Figure 11:
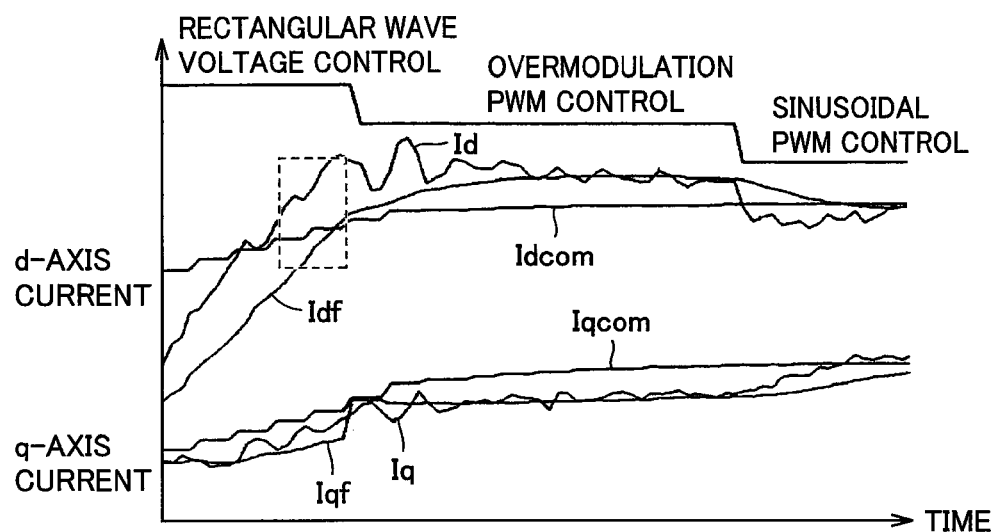
FIG. 11 is a waveform chart illustrating a problem of a current filtering process under the overmodulation PWM control.

With reference to FIGS. 9 to 11, next, problems about the motor control configuration under the typical overmodulation PWM control shown in FIG. 8 will be described. In particular, the following description is given of problems about control stability in the case where the control mode is shifted to the rectangular wave voltage control, the overmodulation PWM control and then the sinusoidal PWM control when the output from AC motor M1 is reduced from the high output area.

With reference to FIG. 9, in the rectangular wave voltage control, the amplitude of the phase voltage is fixed at inverter input voltage VH. Accordingly, on a dq-axis plane, a voltage command vector indicated by a combination of voltage command values Vd# and Vq# is located on a circumference having an origin point as a center thereof. The radius of this circle corresponds to an inverter input voltage (system voltage VH). Then, phase φv of the voltage command vector is controlled by the torque deviation in accordance with the configuration shown in FIG. 7. In FIG. 9, voltage command vector V1 corresponds to a final value of the AC voltage command under the rectangular wave voltage control at the time of switchover from the rectangular wave voltage control to the overmodulation PWM control.

Then, when the control mode is shifted from the rectangular wave voltage control to the overmodulation PWM control, overmodulation PWM control unit 201 (FIG. 8) performs control calculation to generate an AC voltage command corresponding to voltage command vector V2. Herein, voltage command vector V2 corresponds to voltage command values Vd#, Vq# subjected to the amplitude correcting process by voltage amplitude correction unit 270 in FIG. 8.

At the time of switchover from the rectangular wave voltage control to the overmodulation PWM control, the details of control calculation change significantly. Therefore, voltage command vector V1 and voltage command vector V2 are apt to change largely. For this reason, there is a possibility that the motor current varies disadvantageously as shown in, for example, FIG. 10 by the generation of a control command for inverter 14 so as to change the motor applied voltage rapidly. The occurrence of such a control state causes a torque variation in AC motor M1.

It is to be noted that, as shown in FIG. 9, there is a possibility that both the amplitude and phase of the AC voltage command change largely at the time of switchover from the rectangular wave voltage control to the overmodulation PWM control. For this reason, there is a necessity to give attention to such a fact that it is not sufficient for the protection of the current variation shown in FIG. 10 to generate an AC voltage command while providing a guard for preventing a rapid change of the amplitude of the motor applied voltage.

Further, there is a necessity to take an influence of current filter 230 in FIG. 8 into consideration in the overmodulation PWM control.

With reference to FIG. 11, d-axis and q-axis currents Idf and Iqf subjected to the filtering process are obtained in such a manner that d-axis and q-axis currents Id and Iq (actual currents) obtained by dq transformation of sensor detected values are smoothed in a time direction in accordance with the time constant of the filtering process. In particular, it is understood that actual currents Id and Iq gradually match with filter currents Idf and Iqf in a period in which voltage command values Idcom and Iqcom are fixed.

As described above, it is possible to remove a harmonic component superimposed on a motor current in the current filtering process, and therefore it is possible to enhance the control stability. However, if d-axis and q-axis currents change significantly, the alienation between actual currents Id and Iq and filter currents Idf and Iqf becomes large. As a result, there is a possibility that a relation between current command values Idcom and Iqcom is reversed.

For example, in an instance shown with a dotted frame in FIG. 11, actual current Id is larger than current command value Idcom, but filter current Idf is smaller than current command value Idcom. Accordingly, in the feedback control according to the current deviation based on filter current Idf, the motor applied voltage is controlled in the direction of increasing the d-axis current. However, since the actual d-axis current is already larger than current command value Idcom, such a control operation serves as a so-called inverse action to disadvantageously increase the actual d-axis current deviation (Idcom−Id). As a result, there is apprehension that the control becomes unstable.

Accordingly, it is preferable that the relation with the current filtering process is also taken into consideration in order to stabilize the overmodulation PWM control.

(Overmodulation PWM Control (1) According to the Embodiment)

Figure 12:
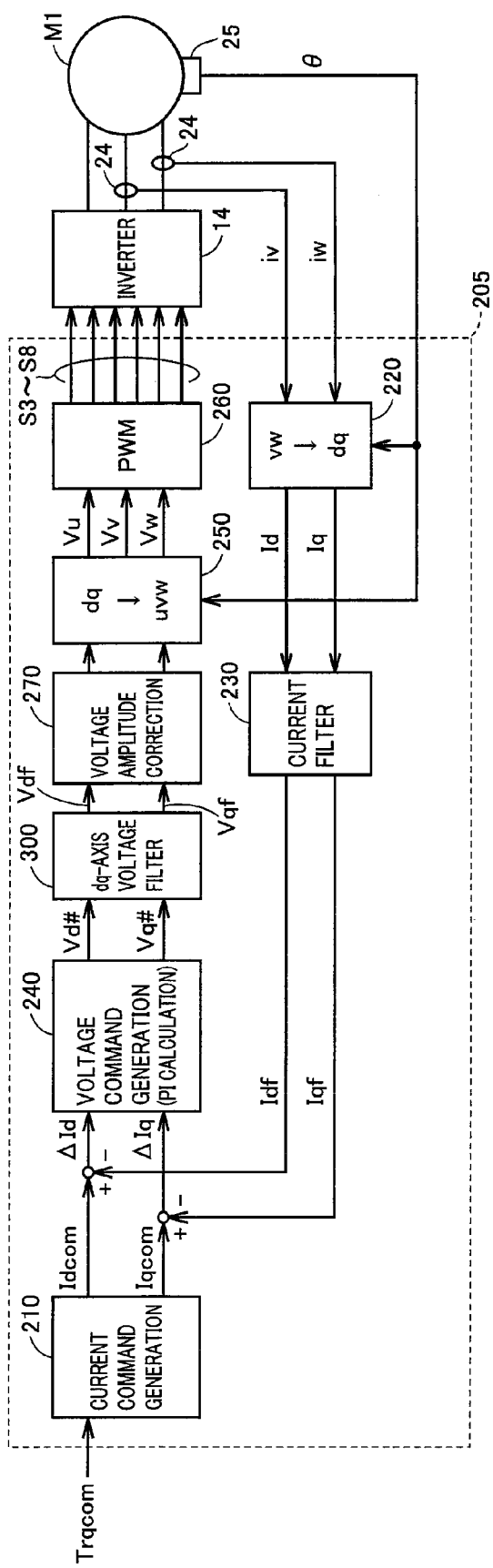
FIG. 12 is a block diagram illustrating a motor control configuration as a first example of the overmodulation PWM control in the AC motor control device according to the embodiment of the present invention.

In order to solve the problems described above, the AC motor control device according to the embodiment of the present invention employs an overmodulation PWM control unit 205 shown in FIG. 12.

With reference to FIG. 12, overmodulation PWM control unit 205 according to the embodiment of the present invention is different from overmodulation PWM control unit 201 shown as a comparative example in FIG. 8 in a point that overmodulation PWM control unit 205 further includes a dq-axis voltage filter 300.

Herein, dq-axis voltage filter 300 calculates filter voltage command values Vdf and Vqf obtained by smoothing, in a time axis direction, voltage command values Vd# and Vq# calculated by voltage command generation unit 240, in accordance with the following expressions (4) and (5).

$$Vdf = \{Vd\# - Vdf(0)\} \cdot fa + Vdf(0) \quad (4)$$

$$Vqf = \{Vq\# - Vqf(0)\} \cdot fa + Vqf(0) \quad (5)$$

In the expressions (4) and (5), Vdf(0) and Vqf(0) represent previous values of filter voltage command values Vdf and Vqf, respectively. Herein, a smoothing coefficient fa has a value within a range of 0 to 1.0. As smoothing coefficient fa approaches 0, a filter time constant becomes large. On the other hand, as smoothing coefficient fa approaches 1.0, the filter time constant becomes small. That is, smoothing coefficient fa can be determined based on a time constant (τv) to be set for dq-axis voltage filter 300 and a control cycle of the overmodulation PWM control.

At the time of control mode switchover from the rectangular wave voltage control, Vdf(0) and Vqf(0) are each set at a final value of the AC voltage command in the rectangular wave voltage control, that is, a value corresponding to voltage command vector V1 in FIG. 9.

Then, voltage amplitude correction unit 270 executes a voltage amplitude correcting process similar to that in FIG. 8 on voltage command values Vdf and Vqf subjected to the smoothing by dq-axis voltage filter 300. Further, dq inverse transformation for obtaining phase voltage commands and PWM modulation are executed as in those in FIG. 8, so that switching control signals S3 to S8 for inverter 14 are generated. In other words, overmodulation PWM control unit 205 executes control operations similar to those by overmodulation PWM control unit 201 in FIG. 8, in addition to the voltage command value filtering process by dq-axis voltage filter 300.

Herein, a preferable design for filter time constant τv by dq-axis voltage filter 300 will be described.

Figure 13:
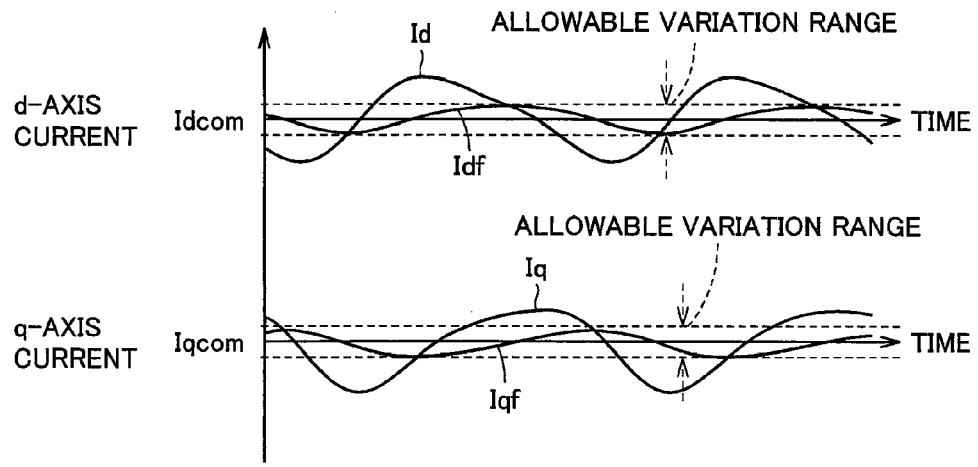
FIG. 13 is a waveform chart illustrating a design of a time constant in the current filtering process under the overmodulation PWM control.

FIG. 13 shows a scheme for designing a time constant by current filter 230. With reference to FIG. 13, as to a d-axis current and a q-axis current each having a DC value, even in motor control in which current command values Idcom and Iqcom are fixed, cyclic errors are superimposed on actual currents Id and Iq based on sensor detected values. This cyclic error is synchronous with an electrical cycle of AC motor M1 (a time required for a change of an electrical angle of 360 degrees), that is, a motor rotation speed.

Current filter 230 executes the filtering process (time constant τc) to suppress AC variations of filter currents Idf and Iqf within a predetermined range shown with dotted lines in FIG. 13. This predetermined range corresponds to an allowable variation range of an electric current to be required for ensuring control stability according to hardware factors such as component errors. Then, time constant τc of current filter 230 is adjusted and determined such that the current variation falls within this allowable variation range. Moreover, in consideration of the point that the cycle of the AC variation is synchronous with electrical cycle Tc of AC motor M1, it is preferable that time constant τc is set at a value which is integer times as large as electrical cycle Tc.

With reference to FIG. 12 again, it is preferable that the time constant (τv) of dq-axis voltage filter 300 is set to be larger than the time constant (τc) of current filter 230 (τv>τc). The execution of the filtering process for setting the time constant is allowed to address the problem about the reverse action of the current control described above with reference to FIG. 11.

Moreover, in the case of the control configuration that updates an actual voltage command for each of a plurality of calculation cycles of voltage command values Vd# and Vq# by the current feedback, that is, in the case of the control configuration that updates an actual voltage command every time voltage command values Vd# are Vq# are calculated repeatedly several times, it is preferable that time constant τv is set at a value which is integer times as large as the current feedback control cycle.

Figure 14:
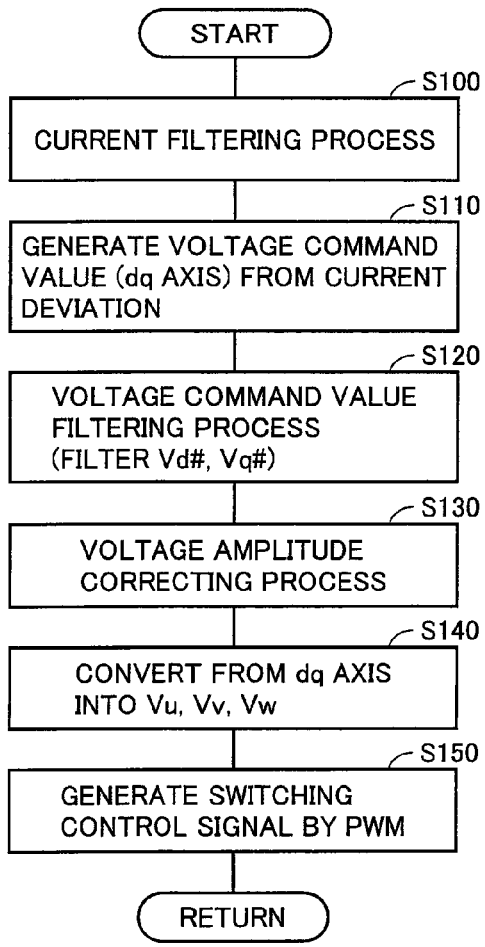
FIG. 14 is a flowchart illustrating a procedure of a controlling process by an overmodulation PWM control unit shown in FIG. 12.

FIG. 14 is a flowchart illustrating a procedure of the controlling process by overmodulation PWM control unit 205 shown in FIG. 12.

Steps of the flowchart shown in FIG. 14 are realized by executing subroutine programs stored previously in control device 30 at predetermined intervals. Alternatively, as to part of the steps, the processes may be realized by constructing dedicated hardware (electronic circuitry).

With reference to FIG. 14, in step S100, control device 30 executes the current filtering process to calculate filter currents Idf and Iqf obtained by smoothing, in a time axis direction, d-axis and q-axis currents Id and Iq (actual currents) calculated based on detected values of current sensor 24. Further, in step S110, control device 30 generates voltage command values Vd# and Vq#, based on current deviations between filter currents Idf and Iqf obtained in step S100 and current command values Idcom and Iqom. That is, the process in step S100 corresponds to the function of current filter 230 in FIG. 12, and the process in step S110 corresponds to the function of voltage command generation unit 240 in FIG. 12.

Further, in step S120, control device 30 executes a filtering process for smoothing, in a time axis direction, voltage command values Vd# and Vq# obtained in step S110. Thus, filter voltage command values Vdf and Vqf in FIG. 12 are obtained. That is, the process in step S120 corresponds to the function of dq-axis voltage filter 300 in FIG. 12.

Next, in step S130, control device 30 executes a voltage amplitude correcting process on filter voltage command values Vdf and Vqf so as to ensure a modulation ratio according to original voltage command values Vd# and Vq#. Thus, the amplitude correcting process is executed to enlarge the amplitude of voltage command signals for voltage command values Vd# and Vq# subjected to the filtering process. That is, the process in step S130 corresponds to the function of voltage amplitude correction unit 270 in FIG. 12.

Further, in step S140, control device 30 converts the d-axis and q-axis voltage commands into U-phase, V-phase and W-phase voltage commands by dq inverse transformation. Further, in step S150, control device 30 generates switching control signals S3 to S8 in accordance with pulse width modulation, based on a comparison between the phase voltage command obtained by the conversion in step S140 and a carrier wave as described with reference to FIG. 7. That is, the process in step S140 corresponds to the function of coordinate conversion unit 250 in FIG. 12, and the process in step S150 corresponds to the function of PWM modulation unit 260 in FIG. 12.

As described above, in the overmodulation PWM control by the AC motor control device according to the embodiment of the present invention, the arrangement of dq-axis voltage filter 300 is allowed to suppress the rapid change of the voltage command value. Thus, as shown in FIG. 15, it is possible to prevent a rapid change of a voltage command at the time of transition, typically, from the rectangular wave voltage control to the overmodulation PWM control.

Figure 15:
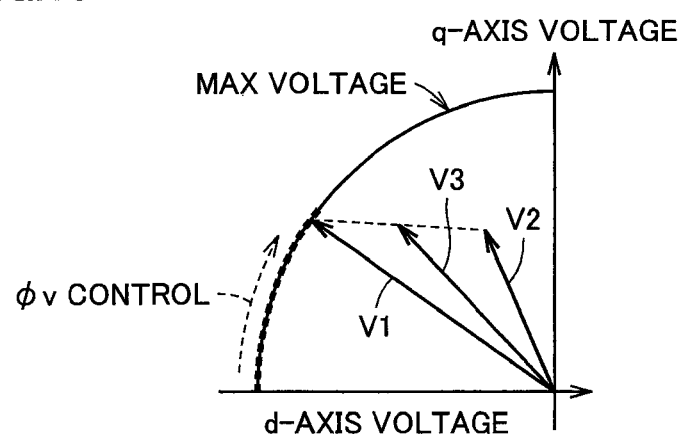
FIG. 15 is a diagram illustrating a change of an AC voltage command at the time of switchover from the rectangular wave voltage control to the overmodulation PWM control under AC motor control according to the embodiment of the present invention.

With reference to FIG. 15, voltage command vectors V1 and V2 are obtained in a manner similar to that shown in FIG. 9. That is, voltage command vector V2 corresponds to voltage command value Vd# or Vq# in the control cycle immediately after the control mode switchover. In the overmodulation PWM control according to this embodiment, dq-axis voltage filter 300 executes the voltage command value filtering process with voltage command values Vd# and Vq# corresponding to voltage command vector V1 defined as previous values Vdf(0) and Vqf(0) in the expressions (4) and (5). As a result, both the amplitude and phase of the initial voltage command in the overmodulation PWM control correspond to a voltage command vector V3 which is an intermediate value between voltage command vectors V1 and V2, at the time of control mode switchover. That is, voltage command vector V3 corresponds to voltage command values Vdf and Vqf subjected to the filtering process.

Figure 16A:
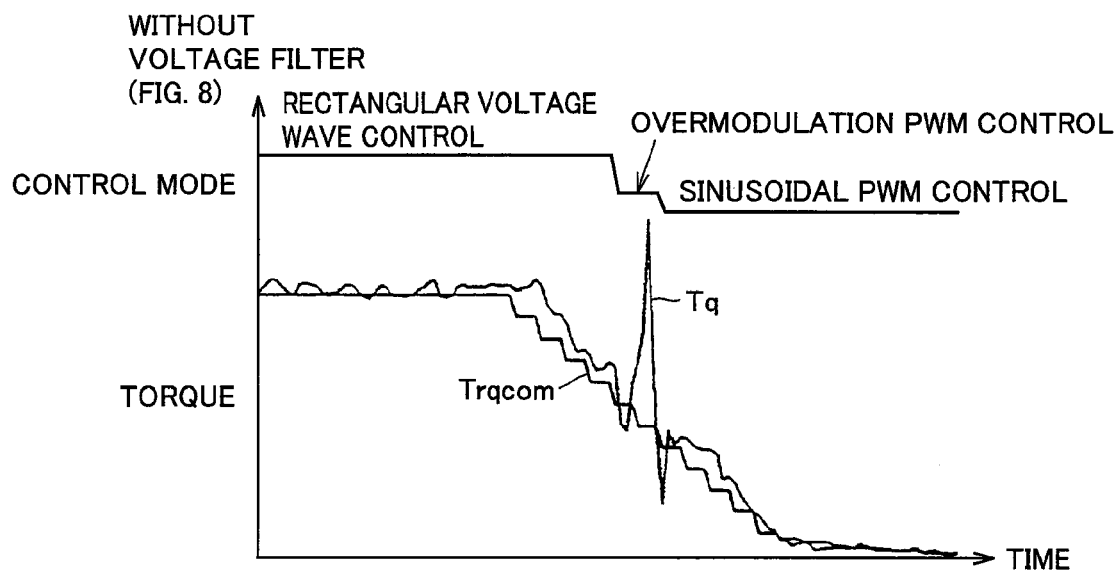
FIG. 16A is a waveform chart (without a voltage filter) of torque control at the time of control mode switchover to the overmodulation PWM control in the AC motor according to the embodiment of the present invention.
Figure 16B:
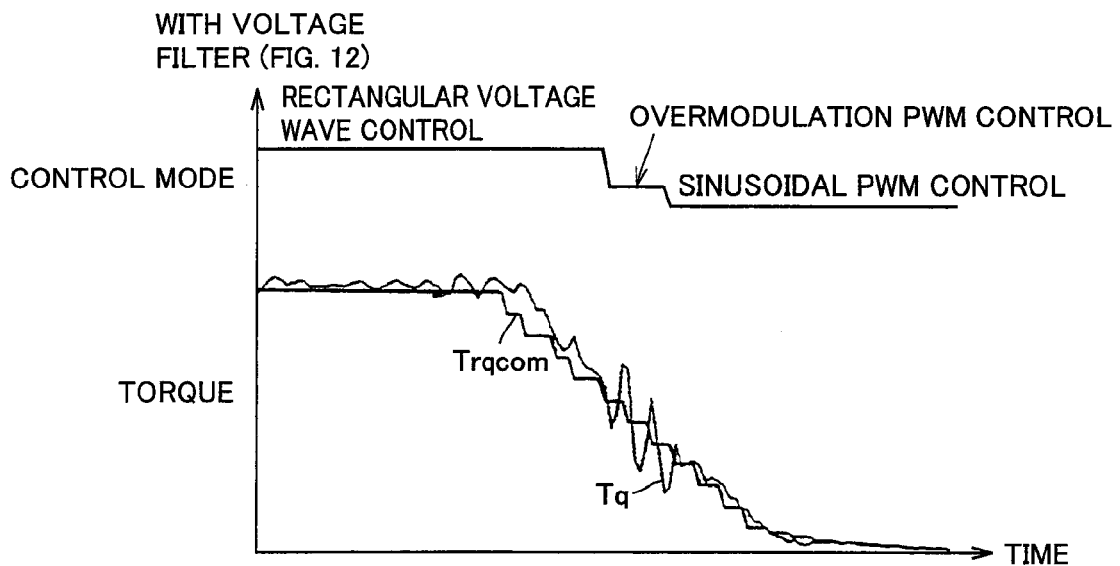
FIG. 16B is a waveform chart of the torque control at the time of control mode switchover, and illustrates an effect of the first example of the overmodulation PWM control in the AC motor according to the embodiment of the present invention.

FIGS. 16A and 16B each show a waveform chart of torque control at the time of control mode switchover. FIG. 16A shows a result of control in a case where dq-axis voltage filter 300 is not provided, that is, a result of control by overmodulation PWM control unit 201 in FIG. 8. FIG. 16B shows a result of control in a case where dq-axis voltage filter 300 is provided, that is, a result of control by overmodulation PWM control unit 205 in FIG. 12.

FIGS. 16A and 16B show results of verification using an actual machine with regard to a torque variation in a case where AC motor M1 is actuated in a same state (torque command value Trqcom). Specifically, the verification using the actual machine is performed in such an operating state that the overmodulation PWM control and the sinusoidal PWM control are applied sequentially as torque command value Trqcom is reduced gradually from the high output area where the rectangular wave voltage control is applied.

With reference to FIG. 16A, in the overmodulation PWM control in which the filtering process is not executed on the voltage command, there is a possibility that, at the time of control mode switchover, the amplitude and the phase of the motor applied voltage are brought by the rapid change of the voltage command as shown in FIG. 9. As a result, torque Tq varies largely at the time of switchover from the rectangular wave voltage control to the overmodulation PWM control.

In contrast, as shown in FIG. 16B, the execution of the filtering process on the voltage command is allowed to prevent the amplitude and phase of the voltage command from being changed rapidly as shown in FIG. 15. As a result, even at the time of switchover from the rectangular wave voltage control to the overmodulation PWM control, the control according to torque command value Trqcom can be realized without a large variation of torque Tq by the prevention of the rapid change of the motor applied voltage.

As described above, in the overmodulation PWM control by the AC motor control device according to the embodiment of the present invention, it is possible to enhance control stability in such a manner that dq-axis voltage filter 300 is provided to suppress a rapid change of a voltage command value. It is to be noted that the time constant (τv) in the filtering process by dq-axis voltage filter 300 can be adjusted to ensure an appropriate control behavior in accordance with hardware factors such as component errors, by experiment using an actual machine, and the like. Moreover, as described above, it is possible to further enhance the control stability by the determination with the relation with the time constant (τc) of current filter 230 or the current feedback control cycle taken into consideration.

(Overmodulation PWM Control (2) According to the Embodiment of the Present Invention)

Figure 17:
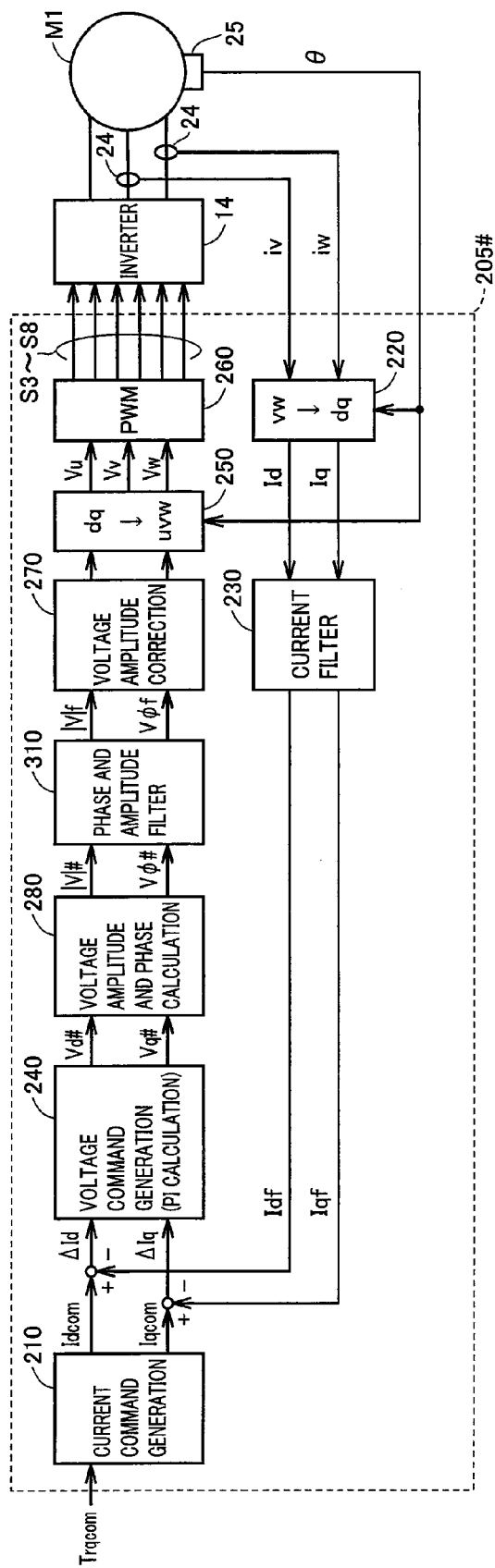
FIG. 17 is a block diagram illustrating a motor control configuration as a second example of the overmodulation PWM control in the AC motor control device according to the embodiment of the present invention.

FIG. 17 shows a modification of the overmodulation PWM control by the AC motor control device according to the embodiment of the present invention.

With reference to FIG. 17, an overmodulation PWM control unit 205# according to the modification is different from overmodulation PWM control unit 205 shown in FIG. 12 in a point that overmodulation PWM control unit 205# includes a voltage amplitude and phase calculation unit 280 and a phase and amplitude filter 310 in place of dq-axis voltage filter 300. Overmodulation PWM control unit 205# is similar to overmodulation PWM control unit 205 shown in FIG. 12 except the configuration described above.

Voltage amplitude and phase calculation unit 280 calculates an amplitude |V|# and a voltage phase Vφ# of a voltage command, in accordance with voltage command values Vd# and Vq# generated by voltage command generation unit 240. Specifically, relations of $|V|\# = (Vd\#^2 + Vq\#^2)^{1/2}$ and $V\phi\# = \tan^{-1}(Vq\#/Vd\#)$ are established.

Phase and amplitude filter 310 executes a filtering process for smoothing, in a time axis direction, voltage amplitude |V|# and voltage phase Vφ calculated by voltage amplitude and phase calculation unit 280, in accordance with the following expressions (6) and (7).

$$|V|f = \{|V|\# - |V|f(0)\} \cdot fa + |V|f(0) \quad (6)$$

$$V\phi f = \{V\phi\# - V\phi f(0)\} \cdot fa + V\phi f(0) \quad (7)$$

In the expressions (6) and (7), |V|f(0) and Vφf(0) represent previous values of the voltage amplitude and voltage phase subjected to the filtering process, respectively. A smoothing coefficient fa is similar to those in the expressions (4) and (5).

Figure 18:
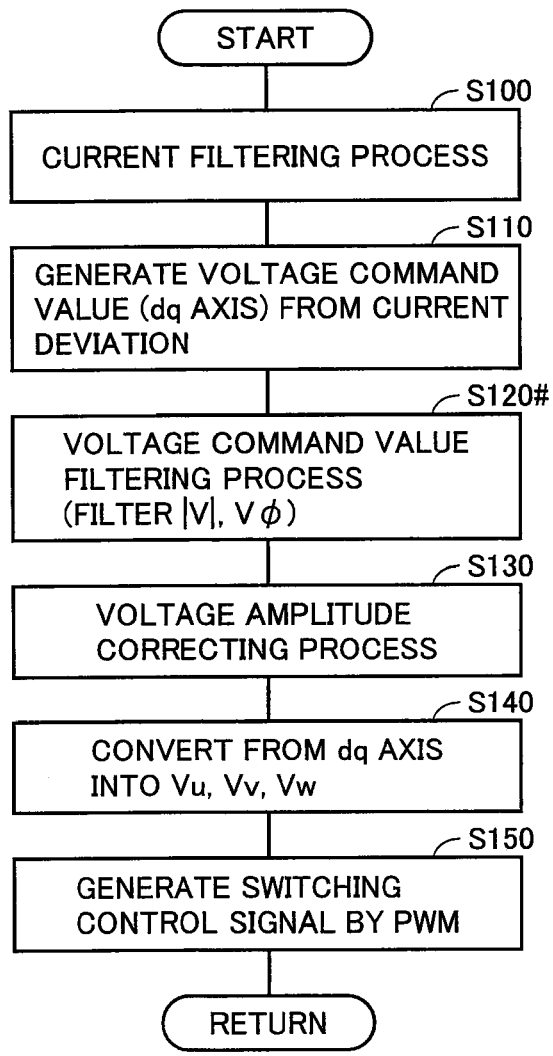
FIG. 18 is a flowchart illustrating a procedure of a controlling process by an overmodulation PWM control unit shown in FIG. 17.

FIG. 18 is a flowchart showing a procedure of a controlling process by overmodulation PWM control unit 205# shown in FIG. 17.

As a comparison of FIG. 18 with FIG. 14, control device 30 executes a series of processes in step S100, step S110, step S120# which is a substitute for step S120 shown in FIG. 14, and steps S130 to S150. Since the processes in steps S100 and S130 to S150 are similar to those in FIG. 14, the description thereof will not be repeated.

In step S120#, control device 30 executes a filtering process for smoothing, in the time axis direction, amplitude |V| and voltage phase Vφ of the voltage command, based on voltage command values Vd# and Vq# generated in step S110. In accordance with the voltage command subjected to the filtering process, next, control device 30 executes a voltage amplitude correcting process (S130) and generates a phase voltage command by dq inverse transformation (step S140). Further, control device 30 generates switching control signals S3 to S8 in accordance with the pulse width modulation control (S150).

Figure 19A:
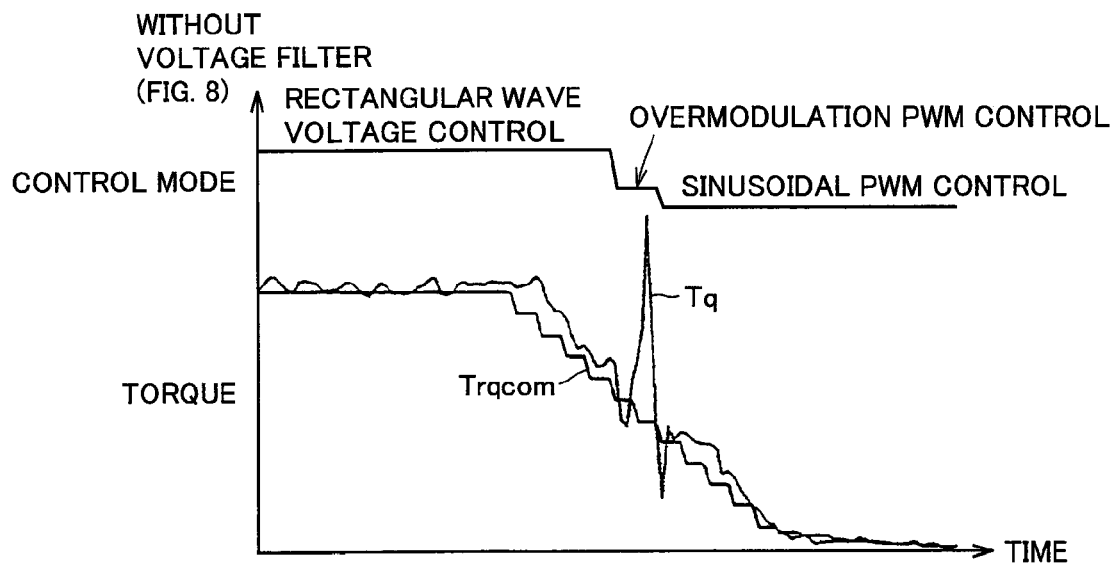
FIG. 19A is a waveform chart (without a voltage filter) of the torque control at the time of control mode switchover to the overmodulation PWM control in the AC motor according to the embodiment of the present invention.
Figure 19B:
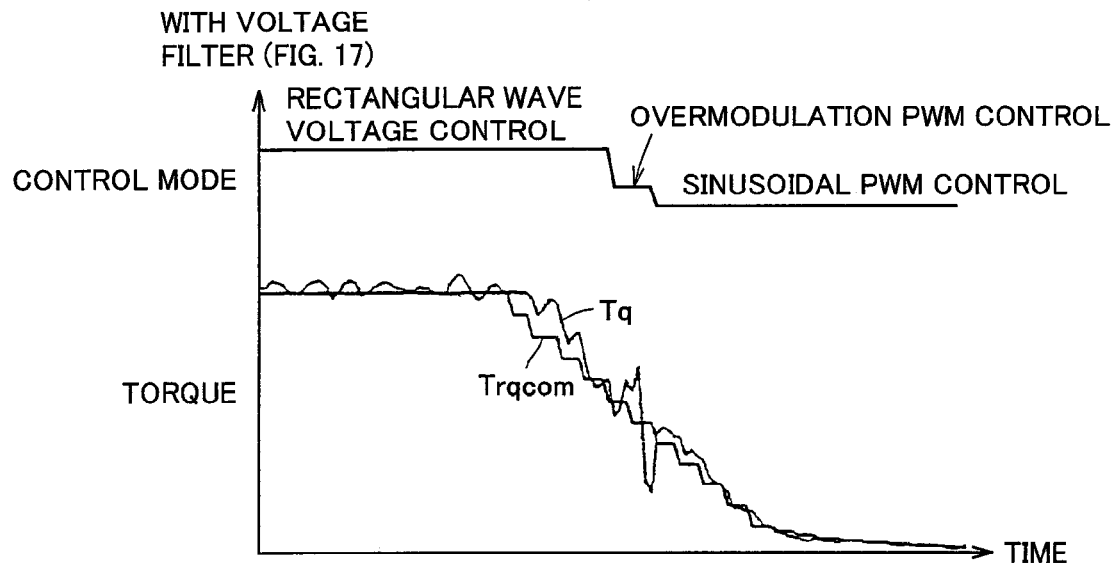
FIG. 19B is a waveform chart of the torque control at the time of control mode switchover, and illustrates an effect of the second example of the overmodulation PWM control in the AC motor according to the embodiment of the present invention.

FIGS. 19A and 19B each show a result of verification using an actual machine under torque control at the time of control mode switchover, in the case of executing the overmodulation PWM control according to the modification shown in FIGS. 17 and 18.

FIG. 19A shows a result of control in the case where phase and amplitude filter 310 is removed from overmodulation PWM control 205# shown in FIG. 17. That is, FIG. 19A shows a waveform chart similar to that shown in FIG. 16A.

In contrast, FIG. 19B shows a result of verification using an actual machine under the torque control with overmodulation PWM control 205# shown in FIG. 17.

With reference to FIG. 19B, it is possible to realize stable control according to torque command value Trqcom without causing a large variation of torque Tq in such a manner as to prevent the phase and amplitude of a voltage command from being changed rapidly at the time of control mode switchover as described above with reference to FIG. 16B even in the case of executing the filtering process with voltage command values Vd# and Vq# based on the current feedback control converted into voltage amplitude |V| and voltage phase Vφ.

Moreover, in consideration of a fact that an AC voltage command is changed remarkably at the time of control mode switchover (immediately after the switchover) from the rectangular wave voltage control to the overmodulation PWM control, the filtering process for a voltage command value may be executed only at the time of control mode switchover, and may not be executed in normal conditions. From the similar viewpoint, it is possible to control the time constant (τv) in the filtering process in a variable manner such that the value at the time of control mode switchover (immediately after the switchover) is different from the value in the remaining period. This time constant variable control can be realized by changing smoothing coefficient fa in each of the expressions (4) to (7), for example.

In the control configurations shown in FIGS. 12 and 17, overmodulation PWM control units 205 and 205# each correspond to a "second control unit", and current command generation unit 240 corresponds to a "calculation unit". Moreover, dq-axis voltage filter 300 and phase and amplitude filter 310 each correspond to a "first filter processing unit", and current filter 230 corresponds to a "second filter processing unit". Further, voltage amplitude correction unit 270 corresponds to an "amplitude correction unit", and coordinate conversion unit 250 and PWM modulation unit 260 form a "modulation unit".

(Other Scheme for Improving Control Stability in Overmodulation PWM)

The following description is given about a control configuration for improving the stability of the overmodulation PWM control in such a manner that the overmodulation PWM control is executed additionally on overmodulation PWM control unit 205 (FIG. 12) and overmodulation PWM control unit 205# (FIG. 17).

Figure 20:
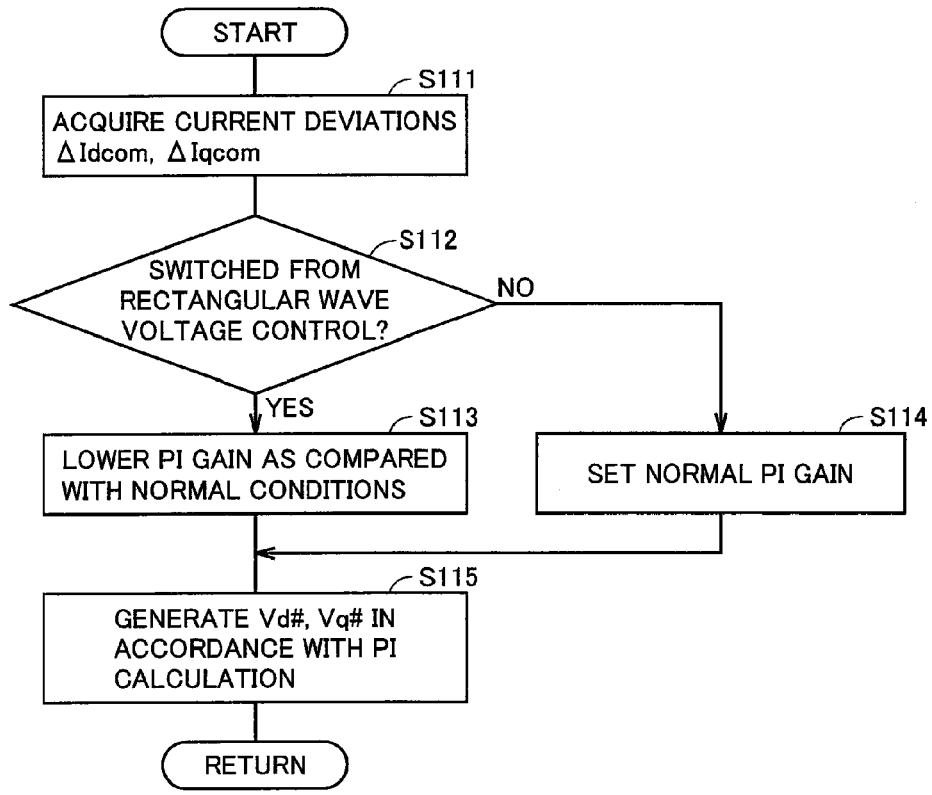
FIG. 20 is a flowchart illustrating a first example of a procedure of a voltage command value generating process for enhancing the stability of the overmodulation PWM control.
Figure 21:
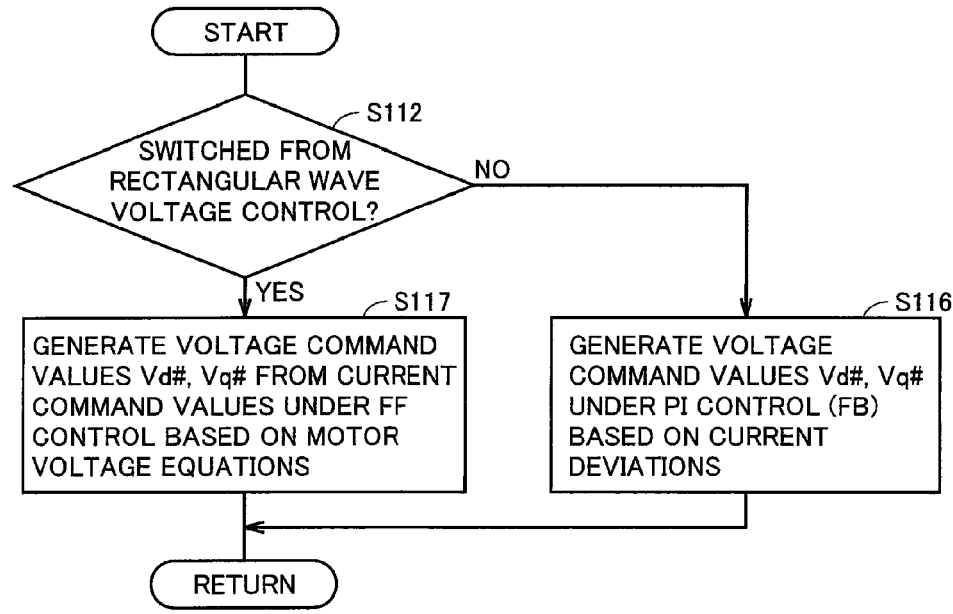
FIG. 21 is a flowchart illustrating a second example of the procedure of the voltage command value generating process for enhancing the stability of the overmodulation PWM control.

FIGS. 20 and 21 each show a flowchart illustrating a modification of a process for generating a voltage command value in voltage command generation unit 240 (FIG. 12, FIG. 17) at the time of switchover from the rectangular wave voltage control mode to the overmodulation PWM control mode.

With reference to FIG. 20, in step S111, voltage command generation unit 240 (control device 30) acquires current deviations ΔId and ΔIq. Further, in step S112, voltage command generation unit 240 (control device 30) determines the timing of control mode switchover from the rectangular wave voltage control. Except the timing of switchover from the rectangular wave voltage control or the timing immediately after the switchover (at the time of determination as NO in S110), voltage command generation unit 240 (control device 30) proceeds the process to step S114. In step S114, voltage command generation unit 240 (control device 30) sets a gain (PI gain) for PI (Proportional Integral) calculation at a normal value in order to obtain voltage command values Vd# and Vq# from current deviations ΔId and ΔIq.

On the other hand, at the time of switchover from the rectangular wave voltage control mode or immediately after the switchover (at the time of determination as YES in S110), in step S113, voltage command generation unit 240 (control device 30) sets the PI gain at a value in normal conditions, that is, a value smaller than that of the PI gain set in step S114.

Next, in S115, voltage command generation unit 240 (control device 30) executes PI calculation based on the PI gain set in step S113 or S114 to generate voltage command values Vd# and Vq#.

With regard to the processes in steps S113 and S114, alternatively, in step S114, the PI calculation (S115) may be executed using current deviations ΔId and ΔIq obtained in step S111 as there are whereas, in step S113, the control process similar to the process of lowering the PI gain may be executed with current deviations ΔId and ΔIq set so to be "m" times (m<1.0) as large as the values acquired in step S111.

According to the flowchart shown in FIG. 20, it is possible to enhance the stability of the overmodulation PWM control because it is possible to prevent a voltage command value from being changed largely at the time of control mode switchover from the rectangular wave voltage control to the overmodulation PWM control, at which the possibility to rapidly change the voltage command value is high.

Alternatively, voltage command generation unit 240 (control device 30) may also generate the voltage command value at the time of control mode switchover from the rectangular wave voltage control in accordance with a flowchart shown in FIG. 21.

With reference to FIG. 21, in step S112, voltage command generation unit 240 (control device 30) determines a timing of control mode switchover from the rectangular wave voltage control. Except the timing of switchover from the rectangular wave voltage control mode or a timing immediately after the switchover (at the time of determination as NO in S112), in step S116, voltage command generation unit 240 (control device 30) generates voltage command values Vd# and Vq# under the feedback control based on current deviations ΔId and ΔIq.

On the other hand, at the time of switchover from the rectangular wave voltage control mode or immediately after the switchover (at the time of determination as YES in S112), voltage command generation unit 240 (control device 30) proceeds the process to step S117 to calculate voltage command values Vd# and Vq# from current command values Idcom and Iqcom under feedforward control based on motor voltage equations.

Herein, the motor voltage equations in step S117 are represented with the following expressions (8) and (9).

$$Vd = Ra \cdot Id - \omega \cdot Lq \cdot Iq \quad (8)$$

$$Vq = \omega \cdot Ld \cdot Id + Ra \cdot Iq + \omega \cdot \phi \quad (9)$$

In the expressions (8) and (9), Ra represents an armature winding resistance, w represents an electrical angular velocity of AC motor M1, and φ represents the number of armature flux linkages in a permanent magnet. A voltage component that depends on a winding resistance contributes in a considerably low rotation area, and a component other than the voltage component becomes dominant as the rotation speed increases. For this reason, the winding resistance component in the expressions (8) and (9) can be ignored in a speed area where the overmodulation PWM control or the rectangular wave voltage control is applied. Hence, the expressions (8) and (9) are represented with the following expressions (10) and (11) at the time when the overmodulation PWM control is applied.

$$Vd\# = -\omega \cdot Lq \cdot Iq \quad (10)$$

$$Vq\# = \omega \cdot Ld \cdot Id + \omega \phi = \omega(Ld \cdot Id + \phi) \quad (11)$$

In step S117, voltage command values Vd# and Vq# are calculated by substitution of "Id=Idcom" and "Iq=Iqcom" in the simplified motor voltage equations (10) and (11).

With this configuration, it is possible to prevent the control from being unstable in such a manner that a current deviation (ΔId, ΔIq) under feedback control is varied with a harmonic component contained in a motor current immediately after the control mode switchover to the overmodulation PWM control.

Figure 22:
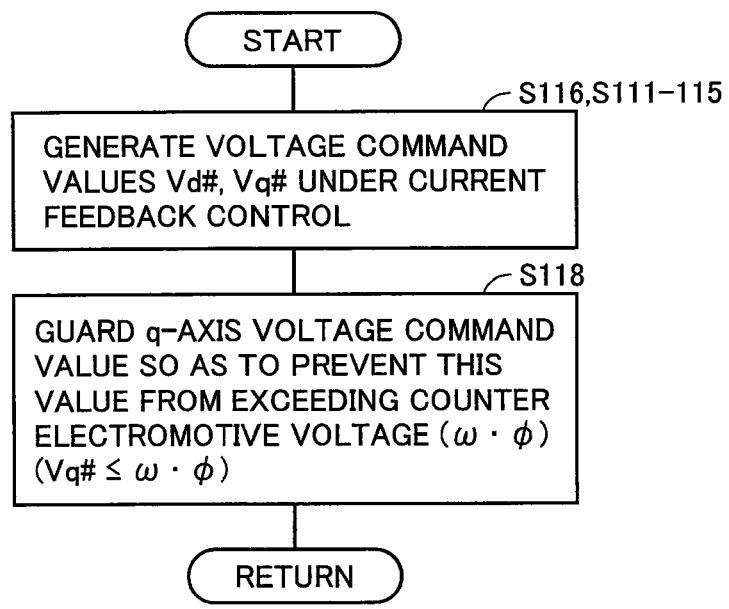
FIG. 22 is a flowchart illustrating a third example of the procedure of the voltage command value generating process for enhancing the stability of the overmodulation PWM control.

As one of countermeasures against control stabilization not only at the time of control mode switchover and immediately after the switchover, but also through the period that the overmodulation PWM control is applied, it is also possible to prevent a torque variation by providing a guard for a voltage command value in accordance with a flowchart shown in FIG. 22.

With reference to FIG. 22, in steps S111 to 115 (FIG. 20) or in step S116 (FIG. 21), voltage command generation unit 240 (control device 30) generates voltage command values Vd# and Vq#, based on current deviations ΔId and ΔIq relative to voltage commands Idcom and Iqcom under the current feedback control. As described above, typically, this calculation is established based on PI (Proportional Integral) calculation.

Further, in step S118, voltage command generation unit 240 (control device 30) guards a range of q-axis voltage command value Vq# so as to prevent voltage command values Vd# and Vq# generated as described above from exceeding a counter electromotive voltage (ω·φ) represented with a product of an angular velocity ω of AC motor M1 and the number of armature flux linkages φ in the permanent magnet.

That is, when voltage command value Vq# obtained in steps S111 to 115 or step S116 exceeds the counter electromotive voltage (ω·φ), the process in step S118 is executed to satisfy the relation of Vq#=ω·φ. As a result, it is possible to avoid the generation of q-axis voltage command value Vq# exceeding the counter electromotive voltage (ω·φ), with reliability.

It is understood from the expression (11) described above that when a sign (positive or negative) of a difference between q-axis voltage command value Vq# and the counter electromotive voltage (ω·φ) is inverted, a sign (positive or negative) of d-axis current Id is also inverted. That is, the occurrence of such a control state that the sign of d-axis current Id is inverted instantly because of influences such as a harmonic component of a motor current, and a delay due to a filtering process for reducing the harmonic component causes a possibility that a torque variation occurs according to this control state.

Accordingly, it is possible to prevent the occurrence of the torque variation during the application of the overmodulation PWM control in such a manner that the process in step S118 is executed for avoiding q-axis voltage command value Vq# from exceeding the counter electromotive voltage (ω·φ).

As described above, it is possible to further enhance the stability of the overmodulation PWM control by operating voltage command generation unit 240 in overmodulation PWM control unit 205 or 205# in accordance with the modifications shown in FIGS. 20 to 22. It is to be noted that the process of guarding q-axis voltage command value Vq#, which is shown in FIG. 22, may be executed after the voltage filtering process or the amplitude correcting process.

This embodiment shows, as a preferable configuration example, the configuration that DC voltage generation unit 10# of the motor drive system includes step-up and step-down converter 12 so as to control an input voltage (system voltage VH) to inverter 14 in a variable manner. However, DC voltage generation unit 10# is not limited to the configuration described in this embodiment as long as to control the input voltage to inverter 14 in a variable manner. Moreover, the variable inverter input voltage is not an essential matter. The present invention may be applied to a configuration that an output voltage from DC power supply B is input to inverter 14 as it is (e.g., a configuration that step-up and step-down converter 12 is not provided).

In this embodiment, further, a permanent magnet motor to be installed on an electric powered vehicle (e.g., a hybrid car, an electric car) in order to drive the vehicle is assumed as an AC motor serving as a load of a motor drive system. The invention of this application may also be applied to a configuration that a given AC motor for use in equipment other than the above motor drive system is used as a load.

INDUSTRIAL APPLICABILITY

The present invention can be used for control of an AC motor under pulse width modulation control having an overmodulation mode.

It should be understood that the embodiments disclosed herein are in all aspects illustrative and not restrictive. The scope of the present invention is defined by the appended claims rather than the foregoing description, and all changes that fall within metes and bounds of the claims, or equivalence such metes and bounds thereof are therefore intended to be embraced by the claims.

DESCRIPTION OF THE REFERENCE SIGNS

5: Earth line, 6, 7: Power line, 10, 13: Voltage sensor, 10#: DC voltage generation unit, 11, 24: Current sensor, 12: Step-up and step-down converter, 14: Inverter, 15: U-phase upper and lower arms, 16: V-phase upper and lower arms, 17: W-phase upper and lower arms, 25: Rotation angle sensor, 30: Control device (ECU), 100: Motor drive and control system, 200: Sinusoidal PWM control unit, 201: Overmodulation PWM control unit (comparative example), 205, 205#: Overmodulation PWM control unit, 210: Current command generation unit, 220, 250: Coordinate conversion unit, 230: Current filter, 240: Voltage command generation unit, 260: PWM modulation unit, 262: Carrier wave, 264: AC voltage command, 270: Voltage amplitude correction unit, 280: Voltage amplitude and phase calculation unit, 300: dq-Axis voltage filter, 310: Phase and amplitude filter, 400: Rectangular wave voltage control unit, 410: Power calculation unit, 420: Torque calculation unit, 430: PI calculation unit, 440: Rectangular wave generator, 450: Signal generation unit, B: DC power supply, C0, C1: Smoothing capacitor, D1 to D8: Antiparallel diode, Id, Iq: d-Axis current, q-Axis current (actual current), Idcom, Iqcom: Voltage command value (d-axis, q-axis), Idf, Iqf: Filter current (d-axis, q-axis), L1: Reactor, M1: AC motor, MCRT (iu, iv, iw): Motor current, Q1 to Q8: Power semiconductor switching element, S1 to S8: Switching control signal, SR1, SR2: System relay, Trqcom: Torque command value, V1 to V3: Voltage command vector, Vb: DC voltage, Vd#, Vq#: Voltage command value (d-axis, q-axis), Vdf, Vdq: Filter voltage command value, VH: System voltage (inverter input voltage), Vφ: voltage phase, ΔId, ΔIq: Current deviation (d-axis, q-axis), ΔTq: Torque deviation, θ: Rotor rotation angle, φv: Voltage phase, ω: Angular velocity.

The invention claimed is:

1. A control device for an AC motor having an applied voltage controlled by an inverter,
the control device comprising:
a current detector for detecting an electric current flowing between said inverter and said AC motor; and
a pulse width modulation control unit for generating a control command for said inverter under pulse width modulation control based on a comparison between an AC voltage command for operating said AC motor in accordance with an operation command and a carrier wave, wherein
said pulse width modulation control unit includes:
a first control unit for generating said control command according to a deviation between a motor current based on a value detected by said current detector and a current command corresponding to said operation command, in accordance with a sinusoidal pulse width modulation scheme; and
a second control unit for generating said control command according to a current deviation between said motor current and said current command, in accordance with an overmodulation pulse width modulation scheme for outputting an applied voltage having a fundamental component larger than that of an applied voltage in said sinusoidal pulse width modulation scheme, and
said second control unit includes:
a calculation unit for obtaining said current deviation, based on said motor current and said current command, and calculating a control value indicating said AC voltage command, according to the obtained current deviation;
a first filter processing unit for smoothing a change of the calculated control value in a time axis direction;
an amplitude correction unit for performing correction calculation on the control value smoothed by said first filter processing unit, in order to enlarge an amplitude of said AC voltage command; and
a modulation unit for converting said control value subjected to said correction calculation into said AC voltage command, and generating said control command, based on the comparison between said AC voltage command and said carrier wave, wherein
said second control unit further includes:
a second filter processing unit for smoothing, in the time axis direction, a change of said motor current based on the value detected by said current detector,
said calculation unit is configured to obtain said current deviation, based on said current command and the motor current smoothed by said second filter processing unit, and
a time constant in the smoothing by said first filter processing unit is larger than a time constant in the smoothing by said second filter processing unit.

2. The AC motor control device according to claim 1, wherein
the time constant in the smoothing by said second filter processing unit is controlled to be predetermined integer times as large as an electrical cycle of said AC motor.

3. The control device for an AC motor according to claim 1, wherein
   said current command contains a d-axis current command value and a q-axis current command value,
   said control value contains a d-axis voltage command value and a q-axis voltage command value each calculated based on said current deviation relative to each of said d-axis current command value and said q-axis current command value, and
   said first filter processing unit is configured to smooth changes of said d-axis voltage command value and said q-axis voltage command value in the time axis direction.

4. The control device for an AC motor according to claim 1, wherein
   said current command contains a d-axis current command value and a q-axis current command value,
   said control value contains a d-axis voltage command value and a q-axis voltage command value each calculated based on said current deviation relative to each of said d-axis current command value and said q-axis current command value, and
   said first filter processing unit is configured to smooth, in the time axis direction, changes of a voltage command amplitude and a voltage command phase each indicated by a combination of said d-axis voltage command value and said q-axis voltage command value.

5. The control device for an AC motor according to claim 1, further comprising:
   a rectangular wave voltage control unit for generating a control command for said inverter such that a rectangular wave voltage subjected to phase control so as to operate said AC motor in accordance with an operation command is applied to said AC motor; and
   a mode switchover determination unit for selecting one of said pulse width modulation control and rectangular wave voltage control by said rectangular wave voltage control unit, according to a control state of said AC motor, wherein
   said calculation unit is configured to reduce a value of a gain for calculating said control value based on said current deviation at the time of control mode switchover from said rectangular wave voltage control to said pulse width modulation control in accordance with said overmodulation pulse width modulation scheme, as compared with at the time of the calculation of said control value after the switchover of said control mode.

6. The control device for an AC motor according to claim 1, further comprising:
   a rectangular wave voltage control unit for generating a control command for said inverter such that a rectangular wave voltage subjected to phase control so as to operate said AC motor in accordance with an operation command is applied to said AC motor; and
   a mode switchover determination unit for selecting one of rectangular wave voltage control by said rectangular wave voltage control unit and the pulse width modulation control by said pulse width modulation control unit, according to a control state of said AC motor, wherein
   said calculation unit is configured to obtain said control value by calculation in which said current command is substituted in a characteristic equation for said AC motor, in place of the calculation based on said current deviation, at the time of control mode switchover from said rectangular wave voltage control to pulse width modulation control in accordance with said overmodulation pulse width modulation scheme.

7. The control device for an AC motor according to claim 1, wherein
   said current command contains a d-axis current command value and a q-axis current command value,
   said control value contains a d-axis voltage command value and a q-axis voltage command value each calculated based on said current deviation relative to each of said d-axis current command value and said q-axis current command value, and
   said calculation unit is configured to obtain said d-axis voltage command value and said q-axis voltage command value while limiting said q-axis voltage command value within a range which does not exceed a counter electromotive voltage at an existing rotation speed of said AC motor.

\* \* \* \* \*